US008713231B2

(12) United States Patent
Nishioka et al.

(10) Patent No.: US 8,713,231 B2
(45) Date of Patent: Apr. 29, 2014

(54) INTERFACE CIRCUIT AND INTERFACE SYSTEM

(75) Inventors: Shinichiro Nishioka, Osaka (JP); Yoshihide Komatsu, Osaka (JP); Hiroshi Suenaga, Osaka (JP); Kohei Masuda, Hyogo (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 13/139,397

(22) PCT Filed: Nov. 1, 2010

(86) PCT No.: PCT/JP2010/006431
§ 371 (c)(1),
(2), (4) Date: Jun. 13, 2011

(87) PCT Pub. No.: WO2011/058715
PCT Pub. Date: May 19, 2011

(65) Prior Publication Data
US 2011/0241432 A1    Oct. 6, 2011

(30) Foreign Application Priority Data

Nov. 13, 2009  (JP) .................................. 2009-259618

(51) Int. Cl.
*G06F 13/42*    (2006.01)
(52) U.S. Cl.
CPC ..................................... *G06F 13/42* (2013.01)
USPC ......................................................... 710/105
(58) Field of Classification Search
CPC ........... G06F 13/42; G06F 13/36; G11C 5/14; H03K 19/094
See application file for complete search history.

(56) References Cited

U.S. PATENT DOCUMENTS 5,715,409 A  *  2/1998  Bucher et al. .................... 710/62
6,243,776 B1 *  6/2001  Lattimore et al. ............ 710/104
6,725,304 B2 *  4/2004  Arimilli et al. ............... 710/106
(Continued)

FOREIGN PATENT DOCUMENTS

JP    2001-307025    11/2001
JP    2002-183691    6/2002
(Continued)

OTHER PUBLICATIONS

International Search Report issued Feb. 8, 2011 in corresponding International (PCT) Application No. PCT/JP2010/006431.

*Primary Examiner* — Khanh Dang
(74) *Attorney, Agent, or Firm* — Wenderoth, Lind & Ponack, L.L.P.

(57) ABSTRACT

To aim to provide an interface circuit that supports both a single-ended method and a differential method as a transmission method, and one of pairs of input terminals for a differential signal is shared to input/output a single-ended signal. A differential signal receiving circuit that receives a differential signal input through the pair of shared terminals is activated when a differential signal is input to a pair of dedicated input terminals for a differential signal, which is different from the pair of shared terminals. After the differential signal receiving circuit is activated, the active state is maintained by a built-in controller.

Accordingly, the activation of the differential signal receiving circuit that receives a differential signal input through the shared terminals is controlled by controlling the differential signal input through the pair of dedicated input terminals, and furthermore, the possibility that the differential signal receiving circuit becomes inactive at an unexpected timing is reduced to a low level.

7 Claims, 18 Drawing Sheets

(56) References Cited

U.S. PATENT DOCUMENTS

| | | |
|---|---|---|
| 7,170,813 B2 * | 1/2007 | Minzoni ........................ 365/229 |
| 2003/0089785 A1 | 5/2003 | Tashiro |
| 2005/0066077 A1 | 3/2005 | Shibata et al. |
| 2006/0097753 A1 | 5/2006 | Shibata et al. |
| 2007/0182452 A1 | 8/2007 | Shibata et al. |
| 2007/0201104 A1 | 8/2007 | Kihara |
| 2008/0022144 A1 | 1/2008 | Shibata et al. |
| 2008/0158206 A1 | 7/2008 | Ishikawa et al. |
| 2008/0189457 A1 * | 8/2008 | Dreps et al. ................... 710/106 |
| 2009/0276683 A1 | 11/2009 | Toyoda et al. |
| 2011/0268198 A1 * | 11/2011 | Nishioka et al. .............. 375/257 |
| 2012/0039404 A1 * | 2/2012 | Chung et al. .................. 375/259 |

FOREIGN PATENT DOCUMENTS

| | | |
|---|---|---|
| JP | 2005-18312 | 1/2005 |
| JP | 2005-236931 | 9/2005 |
| JP | 2007-235462 | 9/2007 |
| JP | 2008-129836 | 6/2008 |
| JP | 2008-147911 | 6/2008 |
| WO | 2008/059588 | 5/2008 |

\* cited by examiner

INTERFACE CIRCUIT AND INTERFACE SYSTEM

TECHNICAL FIELD

The present invention relates to an interface circuit for processing a differential signal.

BACKGROUND ART

There are two methods for transmission between a device such as a memory card and a host such as a personal computer: a transmission method using a single-ended signal (hereinafter, referred to as "single-ended method") and a transmission method using a differential signal (hereinafter, referred to as "differential method").

The single-ended method has an advantage of having an interface circuit with a simple circuit structure, compared with the differential method. On the other hand, the differential method has an advantage of realizing fast transmission, compared with the single-ended method.

When an existing system employs the single-ended method as a transmission method between a device and a host, and a transmission speed therebetween is desired to be faster, a system supporting both the single-ended method and the differential method may be introduced, in view of compatibility with the existing system.

In such a system, each of the device and the host includes both of an interface circuit corresponding to the single-ended method and an interface circuit corresponding to the differential method.

As a technology that reduces the number of signal wires in a system supporting both of the single-ended method and the differential method, a technology described in Patent Literature 1 is known, for example.

According to this technology, a single-ended signal and a differential signal share signal wires so as to reduce the number of signal wires.

On the other hand, when a differential signal receiving circuit for receiving a differential signal is active to receive the differential signal, a specific amount of electric power is consumed even if a valid differential signal is not being received.

As a technology for reducing electric power consumption of the differential signal receiving circuit while a valid differential signal is not being received, a technology described in Patent Literature 2 is known, for example.

According to this technology, a host controls an active state or an inactive state of a device differential signal receiving circuit, using signal wires for transmitting a differential signal.

Here, when the host wants to activate the device differential signal receiving circuit that has been inactive, the host transmits, to the device, a single-ended signal for activating the differential signal receiving circuit. Then when the host wants to inactivate the device differential signal receiving circuit that has been active, the host transmits, to the device, a command (hereinafter, referred to as "stop command") composed of a differential signal for inactivating the differential signal receiving circuit.

In order to control an active state or an inactive state of the differential signal receiving circuit connected to shared signal wires for transmitting both a single-ended signal and a differential signal using the technology described in Patent Literature 2, it can be realized by using signal wires for transmitting only a differential signal, which are different from the shared signal wires for transmitting both signals.

CITATION LIST

Patent Literature 1

Japanese Unexamined Patent Publication No. 2002-183691
Japanese Unexamined Patent Publication No. 2005-236931

SUMMARY OF INVENTION

Technical Problem

When a host and a device communicate with each other, a transmission error might occur and accordingly a garbled bit of a communication signal might occur.

In a system using the technology described in Patent Literature 2, a command that is transmitted by a host and other than a stop command might be garbled into a stop command due to occurrence of a transmission error, and accordingly the device differential signal receiving circuit might become inactive at an unexpected timing.

When the device differential signal receiving circuit becomes inactive at the unexpected timing, normal communication between the host and the device might not be able to be performed.

In view of the above problem, the present invention aims to provide an interface circuit that reduces the possibility that the differential signal receiving circuit becomes inactive at the unexpected timing even when a garbled bit of a communication signal occurs.

Solution to Problem

An interface circuit comprising: a first input terminal to which a single-ended signal and a differential signal are transmitted through an external first transmission path; a second input terminal to which a differential signal is transmitted through an external second transmission path; a single-ended signal receiver and a differential signal receiver which are connected to the first input terminal by wires, and to which the single-ended signal and the differential signal input from the first input terminal are supplied in parallel; a detection circuit that is connected to the second input terminal by wires and is operable to detect input of the differential signal thereto from the second input terminal; and a controller operable, when the detection circuit detects the input of the differential signal thereto from the second input terminal, to start constantly outputting an enable signal to the differential signal receiver, wherein when the detection circuit detects the input of the differential signal thereto from the second input terminal while the differential signal receiver is in an inactive state, the detection circuit activates the differential signal receiver, and the differential signal receiver remains in an active state while the enable signal is being input thereto.

Advantageous Effects of Invention

According to the interface circuit pertaining to the present invention with the above structure, the differential signal receiver maintains an active state while the enable signal is being input.

Accordingly, the above structure can reduce the possibility of stopping the differential signal receiver at an unexpected timing.

DESCRIPTION OF EMBODIMENT

Embodiment

Overview

The following explains a system including a device and a host as an embodiment of an interface circuit pertaining to the present invention. The device is, for example, a memory card equipped with an interface circuit supporting both a single-ended method and a differential method as a transmission method. The host is, for example, a personal computer.

In the interface circuit used in this system, one of pairs of input terminals for a differential signal is shared to input/output a single-ended signal (hereinafter, this pair is referred to as "pair of shared terminals").

Besides, a differential signal receiving circuit that receives a differential signal input through the pair of shared terminals is activated when a differential signal is input through a pair of dedicated input terminals for a differential signal. The pair of dedicated input terminals are different from the pair of shared terminals. After the differential signal receiving circuit is activated, the active state is maintained by a link controller.

Accordingly, the host can control the active state or the inactive state of the differential signal receiving circuit that receives a differential signal input through the pair of shared terminals, by controlling a differential signal output through the pair of dedicated input terminals of the device. Moreover, the possibility of the differential signal receiving circuit stopping at an unexpected timing is reduced.

A structure of the interface circuit pertaining to the present embodiment is described below with reference to the drawings.

<Structure>

Figure 1:
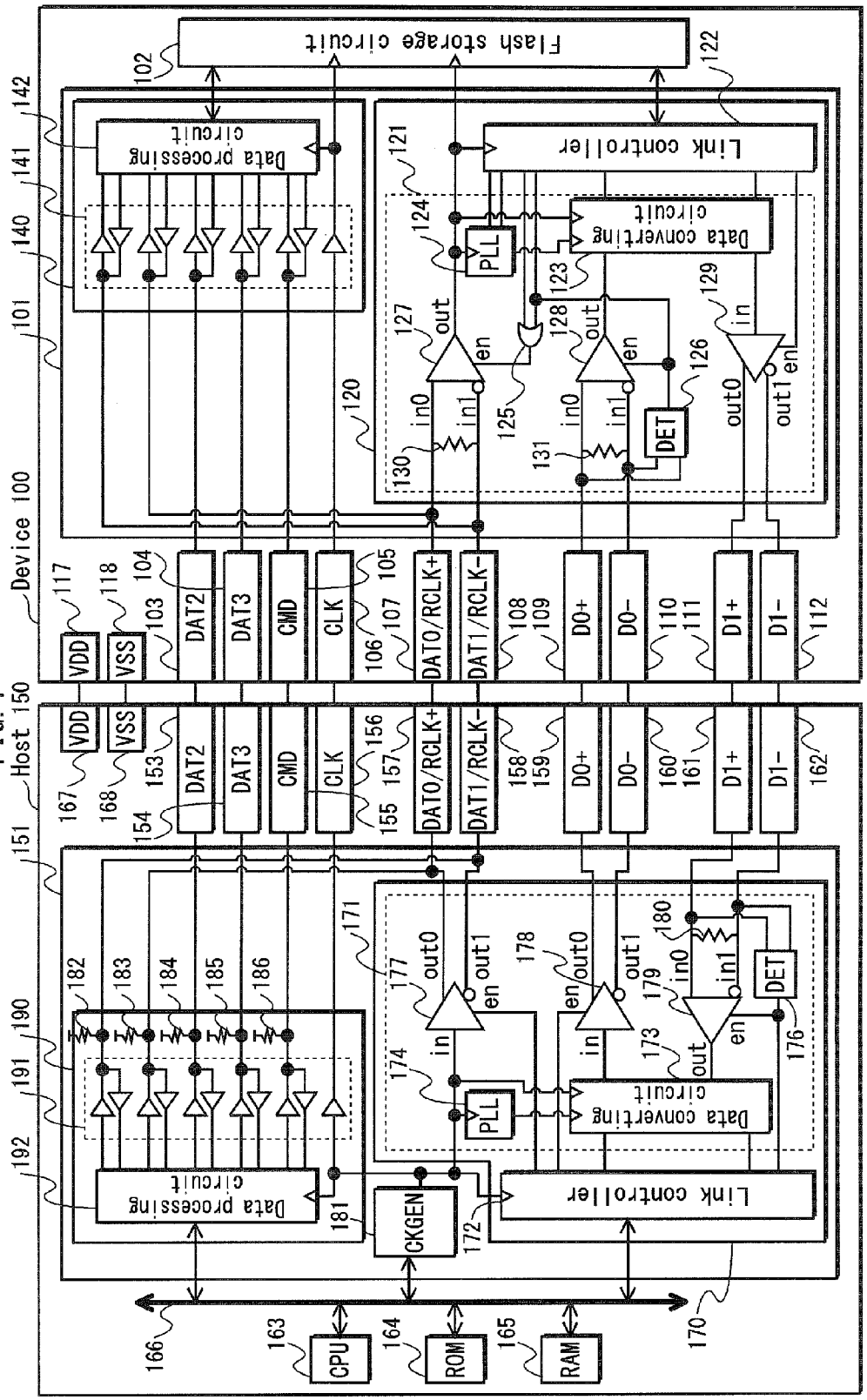
FIG. 1 is a circuit diagram including a device 100 and a host 150.

FIG. 1 is a circuit diagram including a device 100 and a host 150.

<Device 100>

The device 100 is, for example, a memory card of 32 GB (gigabyte) memory capacity. The device 100 includes a device interface circuit 101 that communicates with the host 150, a flash storage circuit 102 that stores therein data, and a terminal group for electrically connecting with the host 150.

The terminal group includes a DAT2 terminal 103, a DAT3 terminal 104, a CMD terminal 105, a CLK terminal 106, a DAT0/RCLK+ terminal 107, a DAT1/RCLK− terminal 108, a D0+ terminal 109, a D0− terminal 110, a D1+ terminal 111, a D1− terminal 112, a VDD terminal 117, and a VSS terminal 118.

The device interface circuit 101 includes a device differential interface circuit 120 that performs communication using a differential signal, and a device single-ended interface circuit 140 that performs communication using a single-ended signal.

The following explains a structure of the device differential interface circuit 120.

<Device Differential Interface Circuit 120>

The device differential interface circuit 120 includes a physical layer PHY 121 and a link controller 122.

The physical layer PHY 121 includes a data converting circuit 123, a PLL (Phase Locked Loop) circuit 124, an OR circuit 125, a detection circuit 126, a differential clock input circuit 127, a differential data input circuit 128, a differential data output circuit 129, and resistances 130 and 131.

The differential clock input circuit 127 includes a data input terminal in0, a data input terminal in1, an enable signal input terminal en, and a data output terminal out. The differential clock input circuit 127 is electrically connected to the DAT0/RCLK+ terminal 107, the DAT1/RCLK− terminal 108, the resistance 130, the PLL circuit 124, the link controller 122, and the flash storage circuit 102. The differential clock input circuit 127 includes the following functions.

Function: to be active while an enable signal for activating the differential clock input circuit 127 is being input through the enable signal input terminal en, so as to receive a differential clock signal input through the data input terminal in0 and the data input terminal in1, generate a single-ended clock signal having the same frequency as the received differential clock signal has based on the received differential clock signal, and outputs the generated signal through the data output terminal out.

Here, the differential clock input circuit 127 can receive a differential clock signal whose potential difference between peaks is approximately 400 mV.

Here, an active state represents a state where a differential clock signal can be received. In this state, electric power is constantly consumed regardless of whether the differential clock signal is being received or not, because a built-in constant current source constantly sends current. On the other hand, an inactive state represents a state where the differential clock signal cannot be received and the built-in constant current source does not send current. Accordingly electric power is not consumed in the inactive state.

In addition, the differential clock input circuit 127 receives a differential clock signal whose maximum operating frequency is, for example, 150 MHz.

The differential data input circuit 128 has the same circuit structure as the differential clock input circuit 127, and is electrically connected to the D0+ terminal 109, the D0− terminal 110, the resistance 131, the detection circuit 126, and the data converting circuit 123. The differential data input circuit 128 includes the following function.

Function: to be active while an enable signal for activating the differential data input circuit 128 is being input through the enable signal input terminal en, so as to receive a differential data signal input through the data input terminal in0 and the data input terminal in1, generate a single-ended data signal based on the received differential data signal, and output the generated signal through the data output terminal out.

The differential data output circuit 129 includes a data input terminal in, a data output terminal out0, an enable signal input terminal en and a data output terminal out1, and is electrically connected to the D1+ terminal 111, the D1− terminal 112, the data converting circuit 123 and the link controller 122. The differential data output circuit 129 includes the following two functions.

Function 1: to be active while an enable signal for activating the differential data output circuit 129 is being input through the enable signal input terminal en, so as to generate a differential signal based on a single-ended signal input through the data input terminal in, and output the generated signal through the data output terminal out0 and the data output terminal out1.

Here, the differential data output circuit 129 outputs a differential signal whose potential difference between peaks is approximately 400 mV. Also, the differential data output circuit 129 can output a differential data signal whose maximum operating frequency is, for example, 1500 MHz.

Function 2: to be inactive while an enable signal is not being input through the enable signal input terminal en, and set a potential of each of the data output terminal out0 and the data output terminal out1 to a VSS potential by using a built-in pull-down circuit.

Here, an active state represents a state where a differential data signal can be output. In this state, since a built-in constant current source constantly sends current, electric power is constantly consumed. On the other hand, an inactive state represents a state where the differential data signal cannot be output and the built-in constant current source does not send current. Accordingly electric power is not consumed in the inactive state.

The PLL circuit 124 includes a clock input terminal, a clock output terminal, an activate signal input terminal and a lock signal output terminal, and is electrically connected to the differential clock input circuit 127, the data converting circuit 123, the link controller 122 and the flash storage circuit 102. The PLL circuit 124 includes the following two functions.

Function 1: to generate a clock signal whose frequency is the same as a frequency of the differential signal transmitted to the differential data input circuit 128 when a clock signal is input through the clock input terminal while an activate signal for activating the PLL circuit 124 is being input through the activate signal input terminal, so as to output the generated signal through the clock output terminal.

Here, in the case where a frequency of the clock signal input through the input terminal is, for example, 150 MHz, the PLL circuit 124 generates a clock signal whose frequency is, for example, 1500 MHz, which is 10 times the frequency of the input clock signal, and outputs the generated signal through the output clock terminal.

Function 2: to output a lock signal through the lock signal output terminal, while a VCO (Voltage Controlled Oscillator) included inside the PLL circuit 124 is stably oscillating.

The detection circuit 126 includes a first input terminal, a second input terminal, a hold signal input terminal and an output terminal, and is electrically connected to the D0+ terminal 109, the D0− terminal 110, the differential data input circuit 128, the OR circuit 125 and the link controller 122. The detection circuit 126 includes the following function.

Function: (i) to output, through the output terminal, a receive-enable signal indicating that differential data signal is being detected, when a potential difference between the first input terminal and the second input terminal has been equal to or larger than a threshold value (here, 200 mV) for a predetermined time period, and (ii) not to output the receive-enable signal through the output terminal, when a potential difference between the first input terminal and the second input terminal has been smaller than the threshold value for a predetermined time period.

Besides, the detection circuit 126 preferably includes hysteresis characteristics in detecting a potential difference, so that detection of a differential signal is stabilized.

Besides, while valid data is being received, bit transitions from Low to High and High to Low might occur in a differential signal input in the detection circuit 126, and accordingly a stable detection might be impossible. Therefore, the link controller 122 may continue outputting a hold signal for a time period that elapses since the link controller 122 started to receive the valid data by receiving the receive-enable signal from the detection circuit 126 until the valid data ends. While the hold signal is being received, the detection circuit 126 may continue outputting the receive-enable signal.

The OR circuit 125 is electrically connected to the detection circuit 126, the link controller 122 and the differential clock input circuit 127. The OR circuit 125 is a two-input OR circuit that outputs an OR signal between a receive-enable signal output from the detection circuit 126 and an enable mode signal output from the link controller 122 for activating the differential clock input circuit 127, as an enable signal to the differential clock input circuit 127.

The resistance 130 is electrically connected to the DAT0/RCLK+ terminal 107 and the DAT1/RCLK− terminal 108. The resistance 130 is a termination resistance for making an amplitude of a differential clock signal appropriate by matching impedance characteristics between the DAT0/RCLK+ terminal 107 and the DAT1/RCLK− terminal 108, as viewed from the host 150. A resistance value of the resistance 130 is, for example, 100 Ω.

The resistance 131 is electrically connected to the D0+ terminal 109 and the D0− terminal 110. The resistance 131 is a termination resistance for making an amplitude of a differential data signal appropriate by matching impedance characteristics between the D0+ terminal 109 and the D1− terminal 110, as viewed from the host 150. A resistance value of the resistance 131 is, for example, 100 Ω.

The data converting circuit 123 is electrically connected to the differential data input circuit 128, the differential data output circuit 129, the link controller 122, the PLL circuit 124 and the differential clock input circuit 127. The data converting circuit 123 includes a function for converting a signal input through the differential data input circuit 128 and then outputting the converted signal to the link controller 122, and a function for converting the signal input through the link controller 122 and then outputting the converted signal to the differential data output circuit 129.

Figure 2:
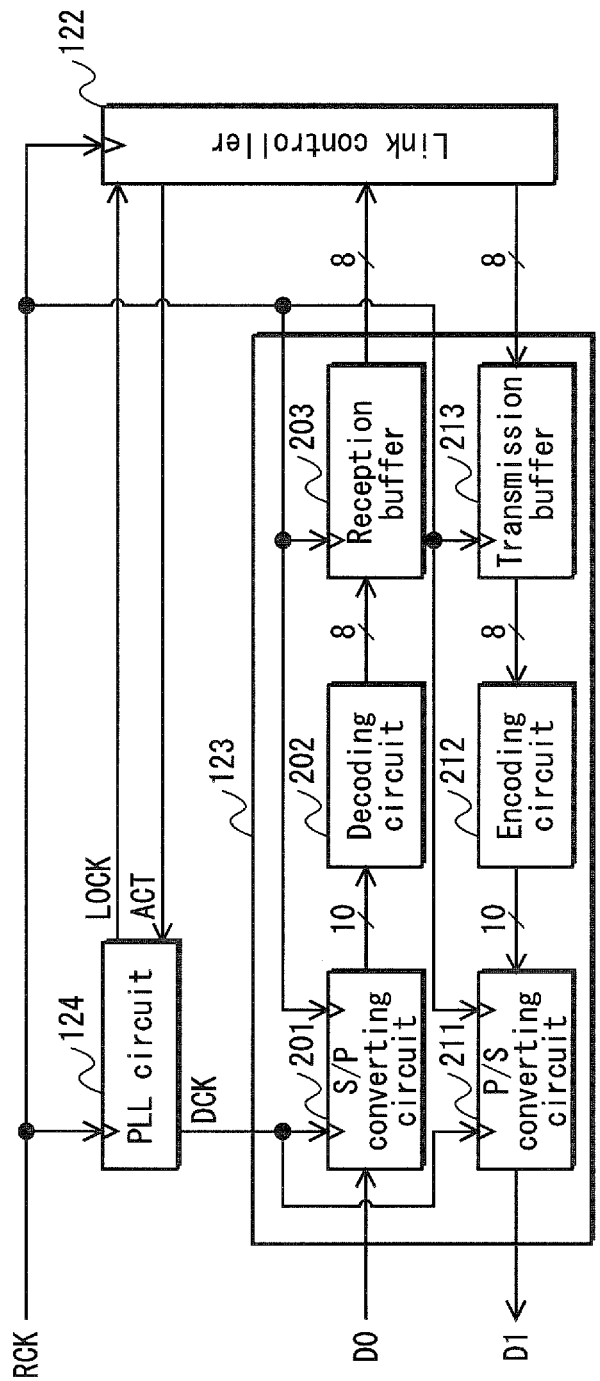
FIG. 2 is a block diagram showing a circuit structure of a data converting circuit 123.

FIG. 2 is a circuit diagram showing a structure of the data converting circuit 123.

As FIG. 2 shows, the data converting circuit 123 includes a serial-to-parallel converting circuit 201, a decoding circuit 202, a reception buffer 203, a parallel-to-serial converting circuit 211, an encoding circuit 212 and a transmission buffer 213.

The serial-to-parallel converting circuit 201 is electrically connected to the differential data input circuit 128, the decoding circuit 202, the PLL circuit 124 and the differential clock input circuit 127. The serial-to-parallel converting circuit 201 receives a one-bit serial signal input through the differential data input circuit 128 through an one-bit flip-flop that operates synchronously with a clock signal of, for example, 1500 MHz that is input through the PLL circuit 124. The serial-to-parallel converting circuit 201 then outputs the serial signal received over 10 cycles through a 10-bit flip-flop that operates synchronously with a clock signal of, for example, 150 MHz that is input through the differential clock input circuit 127, as a 10-bit parallel signal to the decoding circuit 202.

The decoding circuit 202 is electrically connected to the serial-to-parallel converting circuit 201 and the reception buffer 203. The decoding circuit 202 decodes a 10-bit signal that has been encoded using 8 b/10 b encoding and input through the serial-to-parallel converting circuit 201, and outputs the decoded 8-bit signal to the reception buffer 203.

The reception buffer 203 is an FIFO (First In First Out) memory buffer that is electrically connected to the decoding circuit 202 and the link controller 122. The reception buffer 203 temporarily stores therein the 8-bit signal input from the decoding circuit 202 and outputs the same to the link controller 122.

The transmission buffer 213 is an FIFO memory buffer that is electrically connected to the link controller 122 and the encoding circuit 212. The transmission buffer 213 temporarily stores therein the 8-bit signal input from the link controller 122, and outputs the same to the encoding circuit 212.

The encoding circuit 212 is electrically connected to the transmission buffer 213 and the parallel-to-serial converting circuit 211. The encoding circuit 212 generates a 10-bit signal by encoding an 8-bit signal output from the transmission buffer 213 using 8 b/10 b encoding, and outputs the generated 10-bit signal to the parallel-to-serial converting circuit 211.

The parallel-to-serial converting circuit 211 is electrically connected to the encoding circuit 212, the differential data output circuit 129, the PLL circuit 124 and the differential clock input circuit 127. The parallel-to-serial converting circuit 211 receives a 10-bit parallel signal input from the encoding circuit 212 through a 10-bit flip-flop that operates synchronously with a clock signal of, for example, 150 MHz that is input from the differential clock input circuit 127. The parallel-to-serial converting circuit 211 then outputs the received signal as a serial signal to the differential data output circuit 129 through a one-bit flip-flop that operates synchronously with a clock signal of, for example, 1500 MHz that is input from the PLL circuit 124.

To return to FIG. 1 again, the explanation of the structure of the device differential interface circuit 120 will be continued.

The link controller 122 is electrically connected to the data converting circuit 123, the PLL circuit 124, the OR circuit 125, the differential data output circuit 129, the differential clock input circuit 127 and the flash storage circuit 102. The link controller 122 includes the following four functions.

Function 1: to control the physical layer PHY 121 to communicate with the host 150.

Function 2: to write data received from the host 150 in the flash storage circuit 102.

Function 3: to read data that is to be transmitted to the host 150 from the flash storage circuit 102.

Function 4: to start outputting an enable mode signal and an activate signal when a receive-enable signal is input from the detection circuit 126 and reception of a clock is started at the time of initialization, and continue outputting the signals until a standby mode transition processing (described below) is performed.

The following explains a structure of the device single-ended interface circuit 140.

<Device Single-Ended Interface Circuit 140>

The device single-ended interface circuit 140 includes a buffer circuit 141 and a data processing circuit 142.

The buffer circuit 141 is electrically connected to the DAT0/RCLK+ terminal 107, the DAT1/RCLK− terminal 108, the DAT2 terminal 103, the DAT3 terminal 104, the CMD terminal 105, the CLK terminal 106, the data processing circuit 142 and the flash storage circuit 102. The buffer circuit 141 includes the following three functions.

Function 1: to receive a single-ended signal input through each of the DAT0/RCLK+ terminal 107, the DAT1/RCLK− terminal 108, the DAT2 terminal 103, the DAT3 terminal 104 and the CMD terminal 105, and output each received signal to the data processing circuit 142.

Function 2: when each signal output from the data processing circuit 142 is input, to output each input signal to a corresponding terminal as a single-ended signal.

Function 3: to receive a single-ended clock signal of, for example, 50 MHz that is input through the CLK terminal 106, and output the received signal to the data processing circuit 142 and the flash storage circuit 102.

The data processing circuit 142 is electrically connected to the buffer circuit 141 and the flash storage circuit 102. The data processing circuit 142 communicates with the host 150 using the buffer circuit 141, writes data received from the host 150 in the flash storage circuit 102, and reads data that is to be transmitted to the host 150 from the flash storage circuit 102.

Structures of other circuits are explained below.

<Other Circuits>

The flash storage circuit 102 is electrically connected to the link controller 122, the data processing circuit 142, the buffer circuit 141 and the differential clock input circuit 127. The flash storage circuit 102 includes a nonvolatile memory such as a flash memory of 32 GB and a control circuit for controlling the memory.

The VDD terminal 117 and the VSS terminal 118 receive electric power whose potential difference is, for example, 3.3 V, from the host 150.

Each of the DAT2 terminal 103, the DAT3 terminal 104 and the CMD terminal 105 is an input/output terminal for inputting/outputting a single-ended signal from/to the host 150. Each terminal is connected to the buffer circuit 141.

The CLK terminal 106 is an input terminal for inputting a single-ended clock signal from the host 150, and connected to the buffer circuit 141.

The DAT0/RCLK+ terminal 107 and the DAT1/RCLK− terminal 108 are a pair of input terminals for inputting a differential clock signal from the host 150. The pair also serves as two-bit input/output terminals for inputting/outputting a two-bit single-ended signal from/to the host 150. Each of the DAT0/RCLK+ terminal 107 and the DAT1/RCLK− terminal 108 is connected to the differential clock input circuit 127, the resistance 130 and the buffer circuit 141.

The D0+ terminal 109 and the D0− terminal 110 are a pair of input terminals for inputting a differential data signal from the host 150. Each of the D0+ terminal 109 and the D0− terminal 110 is connected to the differential data input circuit 128, the detection circuit 126 and the resistance 131.

The D1+ terminal 111 and the D1− terminal 112 are a pair of output terminals for outputting a differential data signal to the host 150. Each of the D1+ terminal 111 and the D1− terminal 112 is electrically connected to the differential data output circuit 129.

<Host 150>

The host 150 is an apparatus such as a personal computer that communicates with the device 100, and includes a host interface circuit 151 for communicating with the device 100, a CPU 163, a ROM 164, a RAM 165, a bus 166, an unillustrated input device and a terminal group for electrically connecting with the device 100.

The terminal group includes a DAT2 terminal 153, a DAT3 terminal 154, a CMD terminal 155, a CLK terminal 156, a DAT0/RCLK+ terminal 157, a DAT1/RCLK− terminal 158, a D0+ terminal 159, a D0− terminal 160, a D1+ terminal 161, a D1− terminal 162, a VDD terminal 167, and a VSS terminal 168.

The host interface circuit 151 includes a host differential interface circuit 170 performing communication using a differential signal, a host single-ended interface circuit 190 performing communication using a single-ended signal, and a clock generator 181 generating a clock signal.

The following explains a structure of the host differential interface circuit 170.

<Host Differential Interface Circuit 170>

The host differential interface circuit 170 includes a physical layer PHY 171 and a link controller 172.

The physical layer PHY 171 includes a data converting circuit 173, a PLL circuit 174, a detection circuit 176, a differential clock output circuit 177, a differential data output circuit 178, a differential data input circuit 179 and a resistance 180.

The differential clock output circuit includes a data input terminal in, a data output terminal out0, an enable signal input terminal en, and a data output terminal out1, and is electrically connected to the clock generator 181, the DAT0/RCLK+ terminal 157, the DAT1/RCLK− terminal 158 and the link controller 172. The differential clock output circuit 177 includes the following two functions.

Function 1: to be active while an enable signal for activating the differential data output circuit 177 is being input through the enable signal input terminal en, so as to generate a differential signal based on a single-ended signal input through the data input terminal in, and output the generated signal through the data output terminal out0 and the data output terminal out1.

Here, the differential clock output circuit 177 outputs a differential signal whose potential difference between peaks is approximately 400 mV, and can output a differential data signal whose maximum operating frequency is, for example, 1500 MHz.

Function 2: to be inactive while an enable signal is not being input through the enable signal input terminal en, so that each of the data output terminal out0 and the data output terminal out1 is placed in a high impedance state.

The differential data output circuit 178 has the same circuit structure as the differential data output circuit 129, and is electrically connected to the data converting circuit 173, the D0+ terminal 159, the D0− terminal 160 and the link controller 172.

The differential data input circuit 179 has the same circuit structure as the differential data input circuit 128, and is electrically connected to the D1+ terminal 161, the D1− terminal 162, the resistance 180, the detection circuit 176, and the data converting circuit 173.

The PLL circuit 174 includes a clock input terminal and a clock output terminal, and is electrically connected to the clock generator 181 and the data converting circuit 173.

When a clock signal of, for example, 150 MHz is input to the clock input terminal, the PLL circuit 174 generates a clock signal whose frequency is, for example, 1500 MHz, which is 10 times the input clock signal, and outputs the generated signal through the output clock terminal.

The detection circuit 176 has the same circuit structure as the detection circuit 126, and is electrically connected to the D1+ terminal 161, the D1− terminal 162, the differential data input circuit 179 and the link controller 172.

The resistance 180 is electrically connected to the D1+ terminal 161 and the D1− terminal 162. The resistance 180 is a termination resistance for making an amplitude of a differential data signal appropriate by matching impedance characteristics between the D1+ terminal 161 and the D1− terminal 162, as viewed from the host 150. A resistance value of the resistance 180 is, for example, 100 Ω.

The data converting circuit 173 has the same circuit structure as the data converting circuit 123, and is electrically connected to the differential data input circuit 128, the differential data output circuit 129, the link controller 122, the PLL circuit 124 and the differential clock input circuit 127.

The link controller 172 is electrically connected to the data converting circuit 173, the PLL circuit 174, the differential data input circuit 179, the differential clock output circuit 177 and the bus 166. The link controller 172 includes the following three functions.

Function 1: to control the physical layer PHY 121 to communicate with the device 100.

Function 2: to output data received from the device 100 to the bus 166.

Function 3: to read data that is to be transmitted to the device 100 from the bus 166.

The following explains a structure of the host single-ended interface circuit 190.

<Host Single-Ended Interface Circuit 190>

The host single-ended interface circuit 190 is an interface circuit to perform communication with the device 100 using a single-ended signal, and includes a buffer circuit 191, a data processing circuit 192, and pull-up resistances 182-186.

The buffer circuit 191 is electrically connected to the DAT0/RCLK+ terminal 157, the DAT1/RCLK− terminal 158, the DAT2 terminal 153, the DAT3 terminal 154, the CMD terminal 155, the CLK terminal 156, the data processing circuit 192 and the bus 166. The buffer circuit 191 includes the following three functions.

Function 1: to receive a single-ended signal input through each of the DAT0/RCLK+ terminal 157, the DAT1/RCLK− terminal 158, the DAT2 terminal 153, the DAT3 terminal 154 and the CMD terminal 155 so as to output each received signal to the data processing circuit 192.

Function 2: to receive each signal output from the data processing circuit 192 and output each received signal to a corresponding terminal.

Function 3: to receive a single-ended clock signal of, for example, 50 MHz input from the clock generator 181 so as to output the received signal to the CLK terminal 156.

The data processing circuit 192 is electrically connected to the buffer circuit 191, the clock generator 181 and the bus 166. The data processing circuit 192 communicates with the device 100 using the buffer circuit 191, outputs data received from the device 100 to the bus 166, and reads data that is to be transmitted to the device 100 from the bus 166.

Each of the pull-up resistances 182-186 pulls a potential up to a VDD potential, so that a corresponding wire is not placed in a high impedance state. Each resistance value of the pull-up resistances 182-186 is, for example, 50 kΩ.

Structures of other circuits are explained below.

<Other Circuits>

The clock generator 181 is electrically connected to the link controller 172, the PLL circuit 174, the differential clock output circuit 177, the buffer circuit 191 and the data processing circuit 192. The clock generator 181 generates a clock signal of 50 MHz and 150 MHz, outputs the generated clock signal of 50 MHz to the buffer circuit 191 and the data processing circuit 192, and outputs the generated clock signal of 150 MHz to the link controller 172, the PLL circuit 174 and the differential clock output circuit 177.

The CPU 163 is electrically connected to the bus 166 to control the ROM 164, the RAM 165 and the host interface circuit 151 by executing a program stored in the ROM 164 or the RAM 165, and accordingly realizes various functions. For example, the CPU 163 realizes data transmission to device 100 by instructing the link controller 172 to store data stored in the RAM 165 in the flash storage circuit 102.

The ROM 164 is electrically connected to the bus 166, and stores therein a program for defining an operation of the CPU 163 and data used by the CPU 163.

The RAM 165 is electrically connected to the bus 166, and temporarily stores therein data that is to be generated in accordance with execution of a program by the CPU 163.

The bus 166 is electrically connected to the CPU 163, the ROM 164, the RAM 165, the link controller 172 and the data processing circuit 192.

The VDD terminal 167 and the VSS terminal 168 supply electric power whose potential difference is, for example, 3.3 V, to the device 100.

Each of the DAT2 terminal 153, the DAT3 terminal 154 and the CMD terminal 155 is a terminal for inputting/outputting a single-ended signal from/to the device 100, and connected to the buffer circuit 191.

The CLK terminal 156 is an output terminal for inputting a single-ended clock signal to the device 100, and connected to the buffer circuit 191.

The DAT0/RCLK+ terminal 157 and the DAT1/RCLK− terminal 158 are a pair of output terminals for outputting a differential clock signal to the device 100. The pair serves as two-bit input/output terminals for inputting/outputting a two-bit single-ended signal from/to the device 100. Each of the DAT0/RCLK+ terminal 157 and the DAT1/RCLK− terminal 158 is electrically connected to the differential clock output circuit 177 and the buffer circuit 191.

The D0+ terminal 159 and the D0− terminal 160 are a pair of output terminals for outputting a differential data signal to the device 100, and each of them is electrically connected to the differential data output circuit 178.

The D1+ terminal 161 and the D1− terminal 162 are a pair of input terminals to input a differential data signal from the device 100, and each of them is connected to the differential data input circuit 179, the detection circuit 176 and the resistance 180.

An input device (not illustrated) is an input interface for receiving input of a command to operate the host 150 from a user who operates the host 150, and includes, for example, a keyboard and a mouse.

The following explains a connection configuration between the above described device 100 and host 150, with reference to the drawing.

Figure 3:
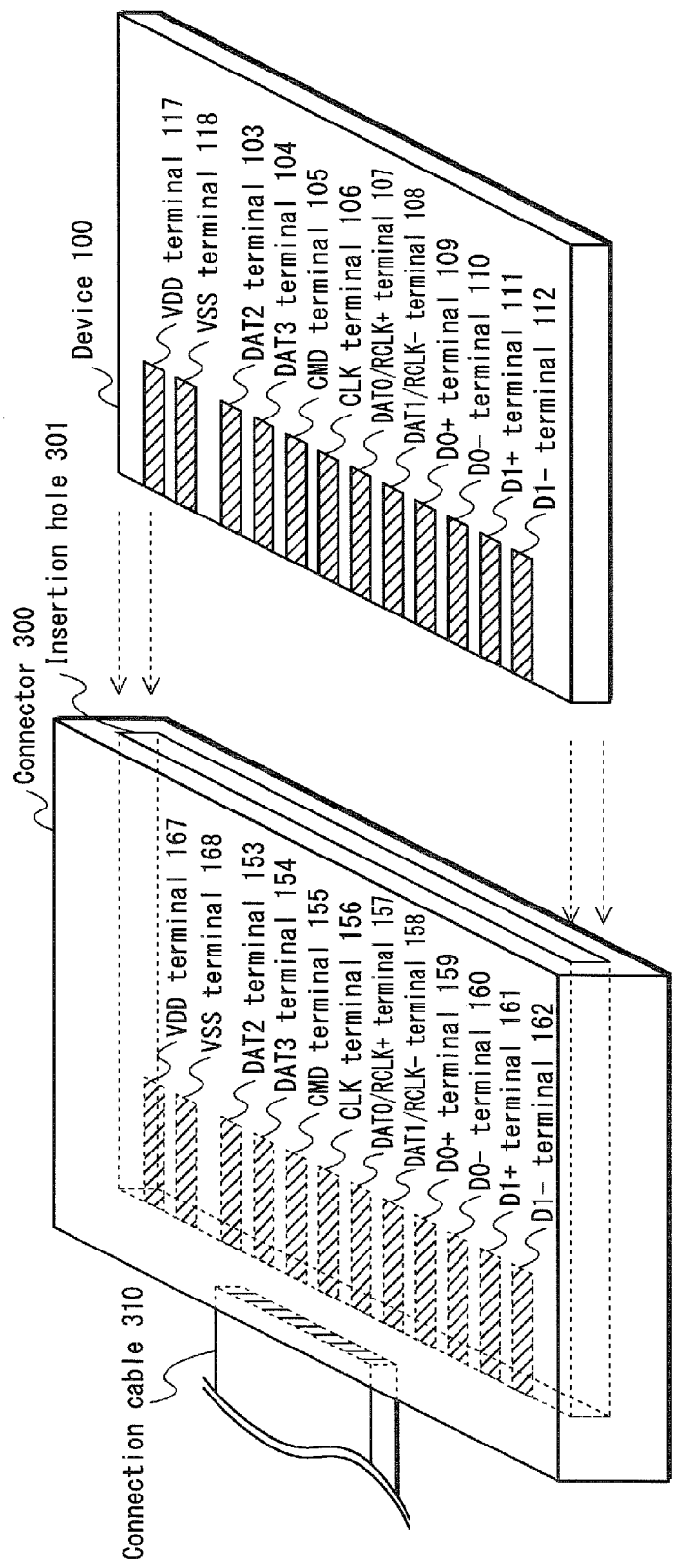
FIG. 3 is a perspective view of the device 100 and a connector 300.

FIG. 3 is a perspective view of the device 100 and a connector 300 that is a part of the host 150.

The device 100 is connected to the host 150 by being inserted into the connector 300.

As FIG. 3 shows, the device 100 is a card-like element that is, for example, 32 mm in length, 24 mm in width and 2.1 mm in thickness, and includes a group of terminals made of metal (such as copper) on a main surface thereof.

The host 150 includes the connector 300, a connection cable 310 and an unillustrated host housing. The connector 300 and the host housing are connected with each other through the connection cable 310.

The connector 300 includes an insertion hole 301 in which the device 100 is inserted, and a group of terminals made of metal (such as copper) inside the insertion hole 301.

When the device 100 is inserted in the insertion hole 301, each terminal in the insertion hole 301 comes to physical contact with a corresponding terminal of the device 100. That is, each terminal in the insertion hole 301 is electrically connected to the corresponding terminal of the device 100.

<Differential Signal>

The following explains a differential signal used for communication between the device 100 and the host 150, with reference to the drawing.

Figure 4:
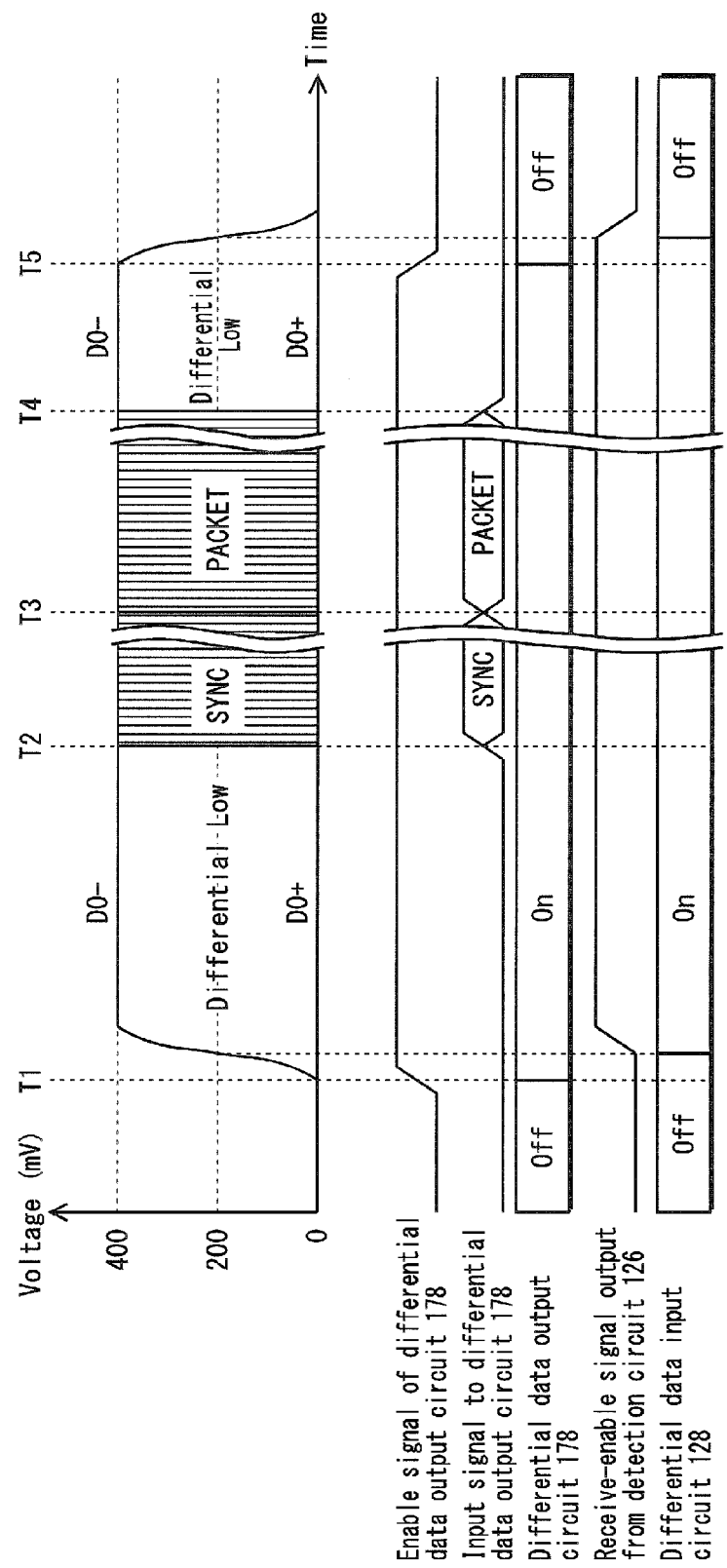
FIG. 4 is a timing chart of a differential signal.

FIG. 4 is a timing chart of a differential signal output by the differential data output circuit 178, as an example of a differential signal used in communication between the device 100 and the host 150.

This timing chart shows an example in which, when an enable signal of the differential data output circuit 178 is output between a time T1 and a time T5, the differential data output circuit 178 outputs a differential packet signal that is packet data composed of a differential signal.

As FIG. 4 shows, a differential signal used in communication between the device 100 and the host 150 is 400 mV in amplitude, and when a potential of one signal wire is 0 V, a potential of another signal wire is 400 mV.

Prior to the time T1, an enable signal of the differential data output circuit 178 is not being output, and accordingly the differential data output circuit 178 is inactive. Then a signal of a VSS potential of 0 V is output through both of the D0+ terminal 159 and the D0− terminal 160.

When an enable signal of the differential data output circuit 178 is output at the time T1, the differential data output circuit 178 changes from the inactive state to an active state, and starts outputting a differential Low signal that corresponds to a logical value "0", which is an input signal.

Here, the differential Low signal represents a differential signal indicating a logical value "0", and for example, a voltage of the D0+ terminal 159 is 0 V and a voltage of the D0+ terminal of the D0− terminal 160 is 400 mV.

The differential data output circuit 178 operates at an operating frequency of 1500 Hz in an active state, and continues outputting a differential Low signal while the logical value "0" is being input.

At the time T2, a synchronization signal of a predetermined number of cycles starts to be input to the differential data output circuit 178, and the differential data output circuit 178 starts outputting a differential synchronization signal that is a differential signal corresponding to the synchronization signal.

Here, the synchronization signal represents a symbol different from a D symbol used for normal data transmission of 8 b/10 b encoding, and for example, a symbol referred to as K28.5 in 8 b/10 b encoding is used.

At a time T3, a packet signal composed of combination of D symbols in 8 b/10 b encoding starts to be input to the differential data circuit 178, and the differential data output circuit 178 starts to output a packet.

At a time T4, a logical value of an input signal of the differential data output circuit 178 becomes "0", and the differential data output circuit 178 starts to output a differential Low signal again.

When an enable signal from the differential data output circuit 178 stops being output at a time T5, the differential data output circuit 178 changes from the active state to the inactive state, and starts to output a signal of a VSS potential of 0 V, to both the D0+ terminal 159 and the D0− terminal 160.

<Operation>

A system composed of the device 100 and the host 150 performs various processings, for example, the host 150 reads data stored in the device 100.

Here, processings performed by the system are divided into a device processing performed by the device 100 and a host processing performed by the host 150, and each processing is explained with reference to the drawing.

<Device Processing>

The device processing represents a processing in which the device 100 communicates with the host 150 using a differential signal.

Figure 5:
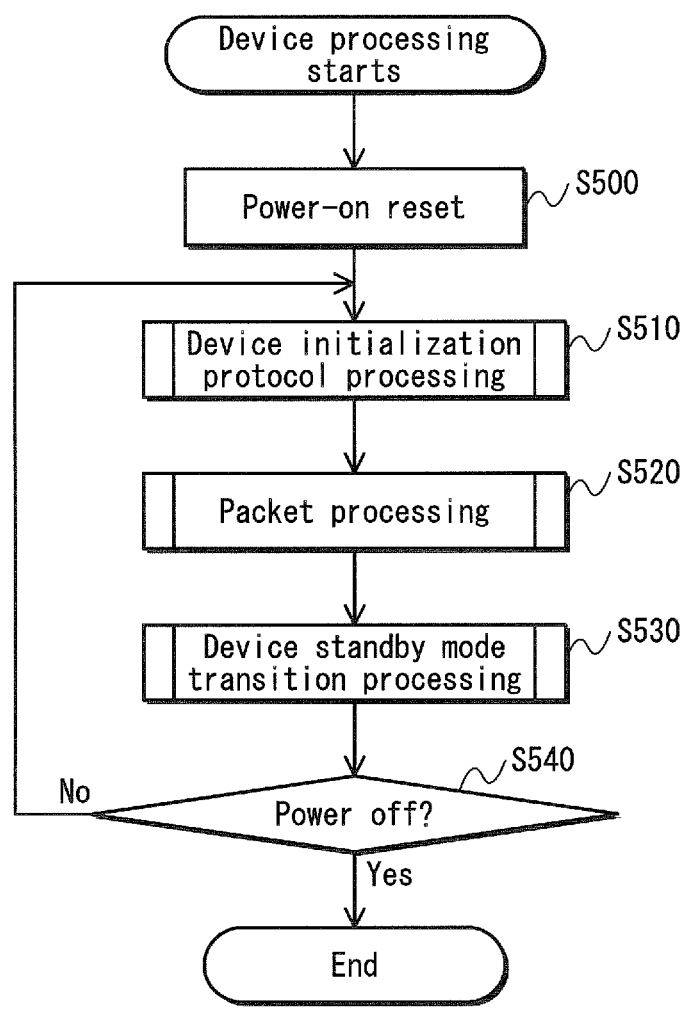
FIG. 5 is a flowchart of a device processing.

FIG. 5 is a flowchart of the device processing performed by the device 100.

The device processing starts when a user using the system composed of the device 100 and the host 150 inserts the device 100 in the connector 200.

When the device 100 is inserted in the connector 200, the VDD terminal 117 and the VDD terminal 167 come to contact with each other, and the VSS terminal 118 and the VSS terminal 168 come to contact with each other. Then electric power whose potential difference is, for example, 3.3 V is supplied from the host 150 through the VDD terminal 117 and the VSS terminal 118, and accordingly the device 100 is activated.

When the device 100 is activated, the link controller 122 and the physical layer PHY 121 are reset by power-on reset and initialized (Step S500) to be in standby mode.

During the standby mode, the differential clock input circuit 127, the differential data input circuit 128 and the differential data output circuit 129 are in an inactive state, and accordingly the PLL circuit 124 becomes inactive.

After being placed in the standby mode, the device 100 becomes a state where packet communication is possible using the host 150 and a differential signal, by executing a device initialization processing (Step S510) that is described later.

After a processing of the Step S510 ends, the device 100 executes a packet processing (Step S520) that is described later and performs packet communication with the host 150.

After the packet communication with the host 150 ends, the device 100 returns to the standby mode by executing a device standby mode transition processing (Step S530) that is described later.

After the device 100 is placed in the standby mode again, if the device 100 is removed from the connector 200 and accordingly electric power stops being supplied through the VDD terminal 117 and the VSS terminal 118 (Step S540: Yes), the device processing ends.

After the device 100 is placed in the standby mode again, if the device 100 is not removed from the connector 200 and accordingly electric power does not stop being supplied through the VDD terminal 117 and the VSS terminal 118 (Step S540: No), the device processing returns to Step S510 and processings of Step S510 onward are performed.

<Host Processing>

The host processing represents a processing in which the host 150 communicates with the device 100 using a differential signal.

Figure 6:
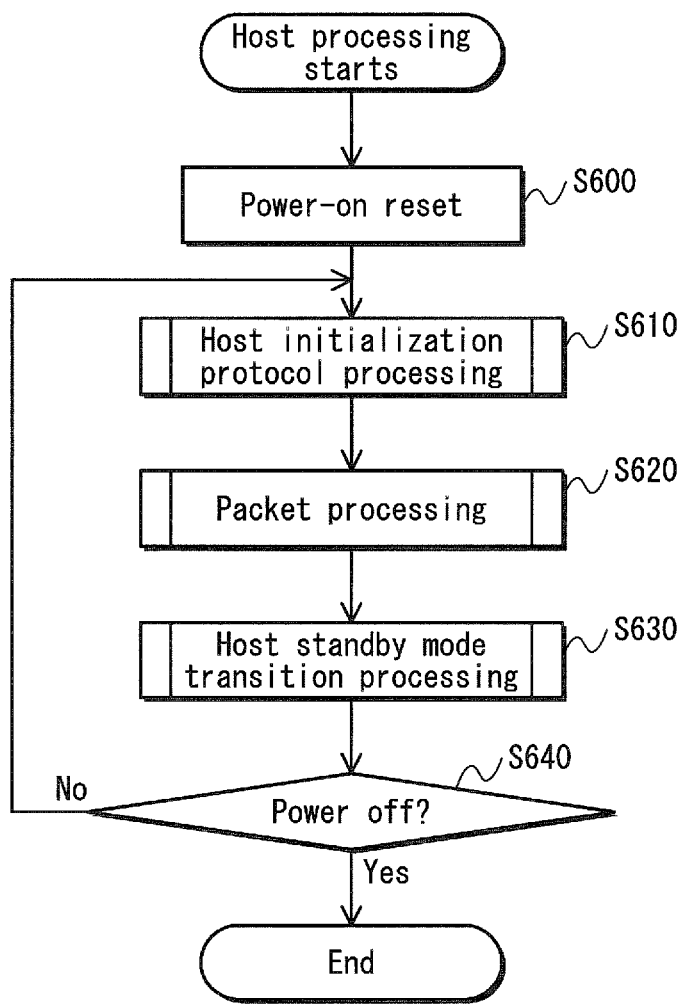
FIG. 6 is a flowchart of a host processing.

FIG. 6 is a flowchart of the host processing performed by the host 150.

The host processing starts when a user who uses the system composed of the device 100 and the host 150 inserts the device 100 in the connector 200 to operate an input device of the host 150 to input a notification signal indicating that the device 100 is electrically connected to the CPU 163.

When the notification signal indicating that the device 100 is connected to the CPU 163 is input, the CPU 163 resets the link controller 172 and the physical layer PHY 171 by power-on reset for initialization (Step S600).

When the link controller 172 and the physical layer PHY 171 are initialized, a host initialization processing that is described later (Step S610) is executed, and then the device 100 is placed in a state where packet communication is possible using a differential signal.

After a processing of the Step S610 ends, the host 150 executes a packet processing (Step S620) that is described later to perform packet communication with the device 100.

After the packet communication with the device 100 ends, the host 150 executes a host standby mode transition processing (Step S630) that is described later to set the device 100 to the standby mode, and causes the link controller 172 and the physical layer PHY 171 to return to the initialized state in Step S600.

After a processing of Step S630 ends, when a user operates the input device of the host 150 to input a notification signal indicating that the device 100 is disconnected to the CPU 163 (Step S640: Yes), the CPU 163 turns off an electric power source that supplies electric power to the link controller 172 and the physical layer PHY 171. Then the host processing ends.

After a processing of Step S630 ends, if the notification signal indicating that the device 100 is disconnected to the CPU 163 is not input to the host 150 (Step S640: No), the host processing returns to Step S610 and the host 150 executes processings of Step S610 onward.

<Device Initialization Protocol Processing>

The device initialization protocol processing allows the device 100 to perform packet communication with the host 150 using a differential signal.

Figure 7:
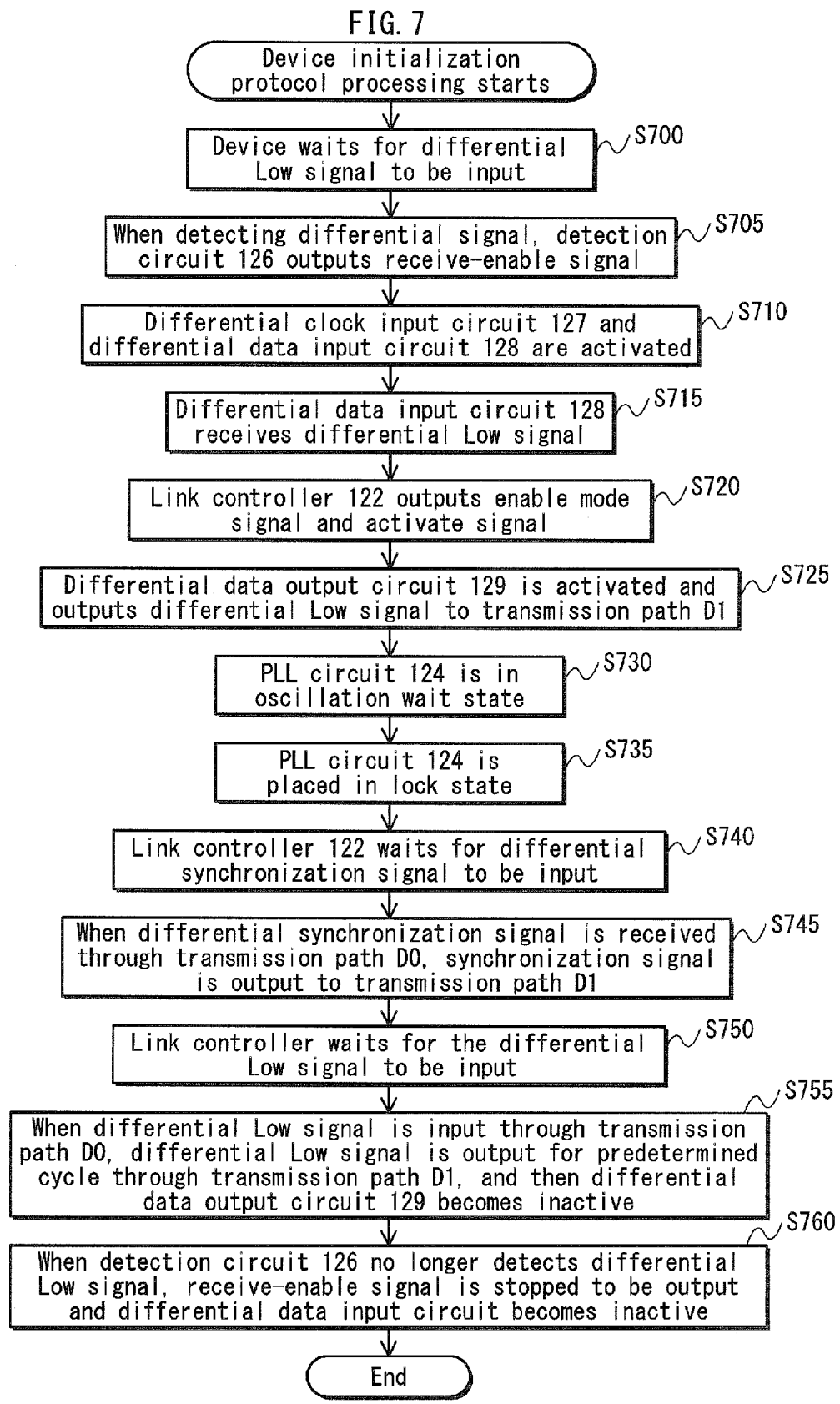
FIG. 7 is a flowchart of a device initialization protocol processing.
Figure 8:
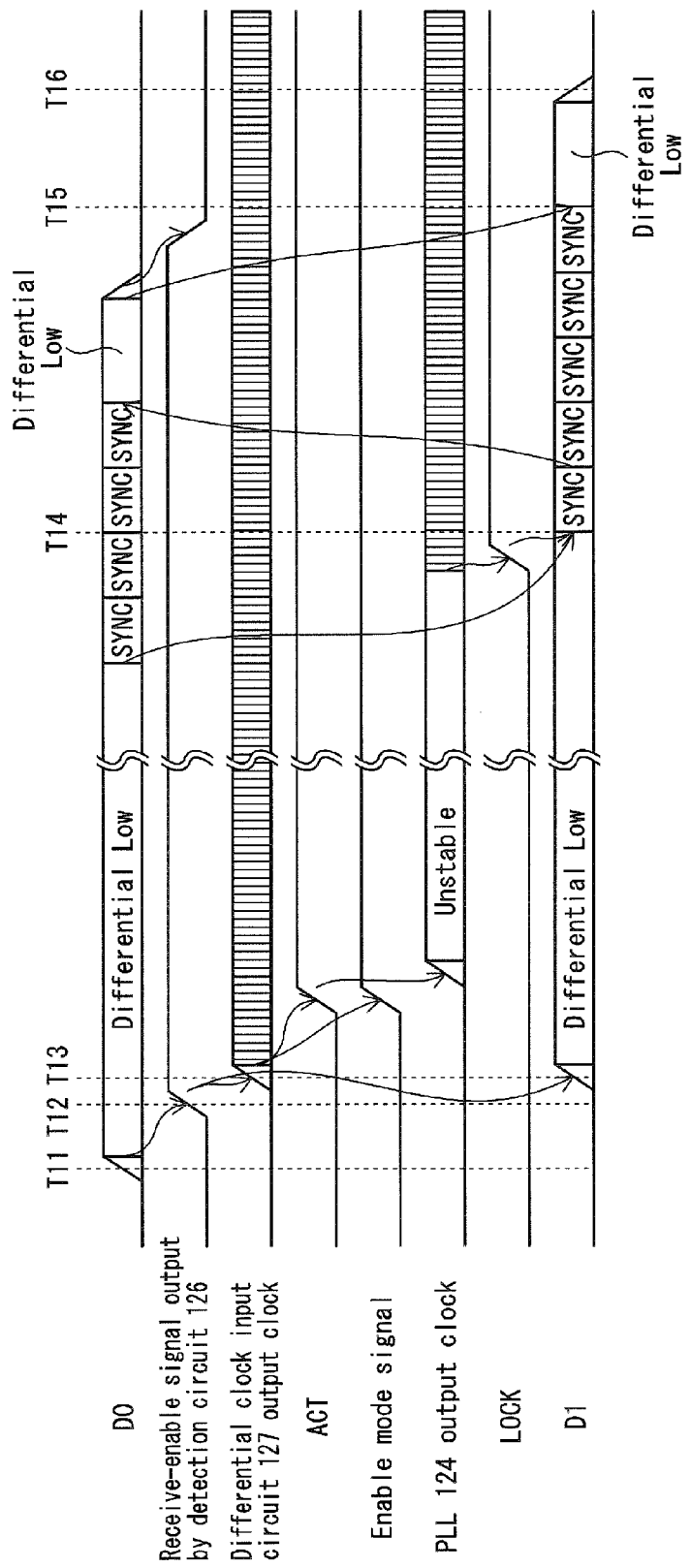
FIG. 8 is a timing chart of the device initialization protocol processing.

FIG. 7 is a flowchart of the device initialization protocol processing. FIG. 8 is a timing chart of the device initialization protocol processing.

Device initialization protocol processing starts when the device 100 is placed in the standby mode.

During the standby mode, the device 100 waits for a differential Low signal to be input through the D0+ terminal 109 and the D0− terminal 110 (Step S700).

When the differential Low signal is input through the D0+ terminal 109 and the D0− terminal 110 (FIG. 8, time T11), the detection circuit 126 detects input of the differential signal, and then outputs a receive-enable signal (Step S705: time T12).

The differential clock input circuit 127 and the differential data input circuit 128 are activated when the receive-enable signal is input (Step S710), and the differential clock input circuit 127 starts receiving a differential reference clock signal and the differential data input circuit 128 starts receiving the differential Low signal (Step S715).

When starting receiving a reference clock based on the receive-enable signal, the link controller 122 outputs an enable mode signal and an activate signal (Step S720), and accordingly the PLL circuit 124 is activated. After that, the differential clock input circuit 127 continues receiving the reference clock signal based not on the receive-enable signal from the detection circuit 126 but on the enable mode signal.

On the other hand, the link controller 122 activates the differential data output circuit 129 by sending the enable signal thereto, and causes the differential data output circuit 129 to output the differential Low signal to the D1+ terminal 111 and the D1− terminal 112 (Step S725: time T13).

The PLL circuit 124 is in a state where oscillation is unstable (oscillation wait state of the PLL circuit 124: Step S730) for a while after activation. After oscillation becomes stable and the PLL circuit 124 is placed in a lock state (Step S735), the PLL circuit 124 notifies the link controller 122 that the PLL circuit 124 is in the lock state by outputting a lock signal to the link controller 122.

When the lock signal is received, the link controller 122 waits for a differential synchronization signal to be input through the D0+ terminal 109 and the D0− terminal 110 (Step S740).

When the differential synchronization signal is input through the D0+ terminal 109 and the D0− terminal 110, the link controller 122 causes the differential data output circuit 129 to output the differential synchronization signal to the D1+ terminal 111 and the D1− terminal 112 (Step S745: time T14), and then waits for the differential Low signal to be input through the D0+ terminal 109 and the D0− terminal 110 (Step S750).

When the differential data input circuit 128 receives the differential Low signal input through the D0+ terminal 109 and the D0− terminal 110 (time T15), the link controller 122 causes the differential data output circuit 129 to output the differential Low signal through the D1+ terminal 111 and the D1− terminal 112 for a predetermined cycle. After that, the link controller 122 stops the enable signal output to the differential data output circuit 129, and places the differential data output circuit 129 in an inactive state (Step S755: time T16).

On the other hand, when the differential Low signal stops being input through the D0+ terminal 109 and the D0− terminal 110, the detection circuit 126 stops outputting the receive-enable signal (Step S760).

When the receive-enable signal stops being output, the differential data input circuit 128 is placed in an inactive state.

When processings of Step S755 and Step S760 end, the device initialization protocol processing ends.

Even if the device initialization protocol processing ends, the link controller 122 continues outputting the enable mode signal and the activate signal. Accordingly, the differential clock input circuit 127 continues receiving the differential reference clock signal and the PLL circuit 124 continues oscillating.

<Host Initialization Protocol Processing>

In the host initialization protocol processing, the host 150 allows the device 100 to perform communication.

Figure 9:
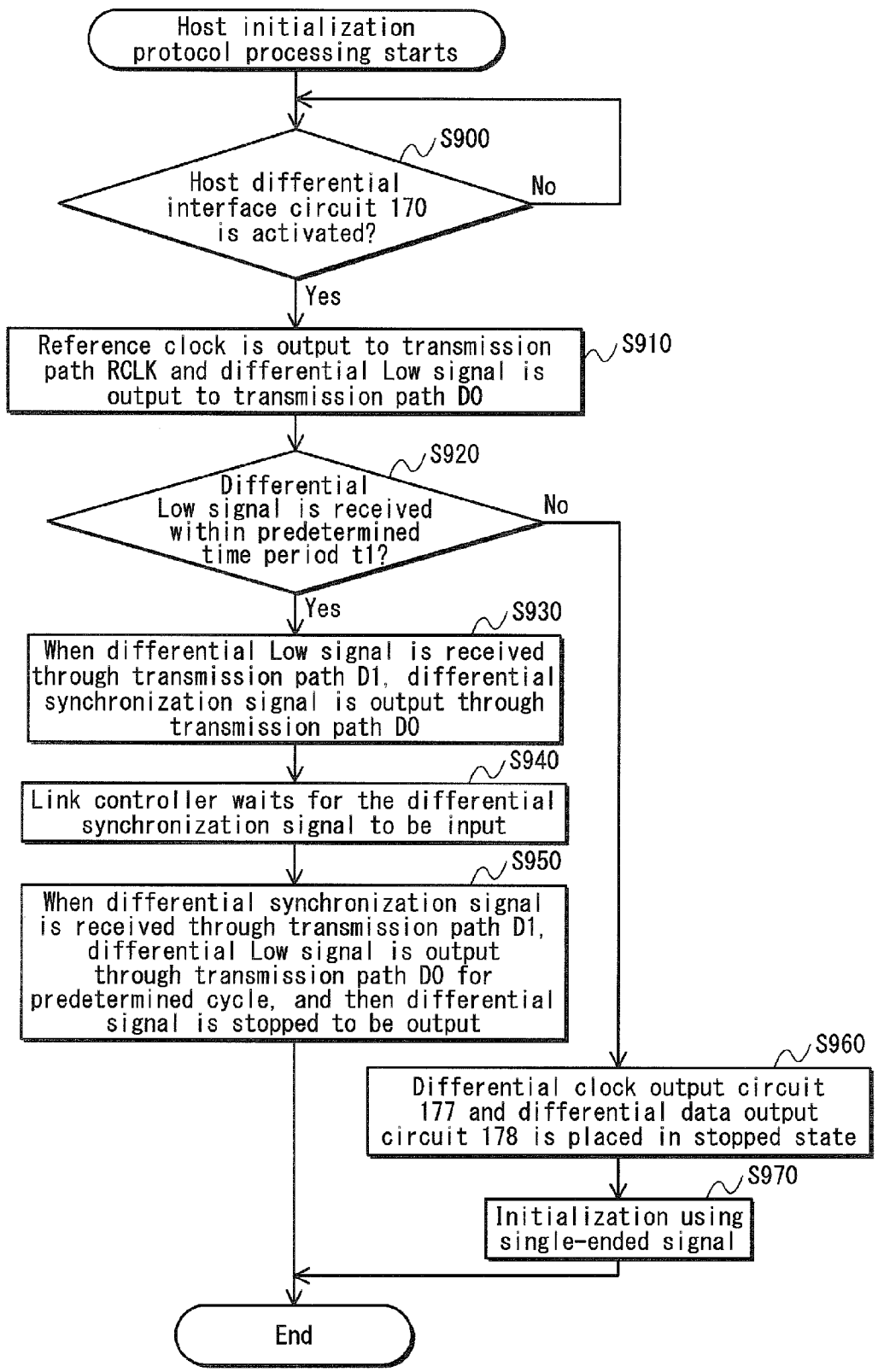
FIG. 9 is a flowchart of a host initialization protocol processing.
Figure 10:
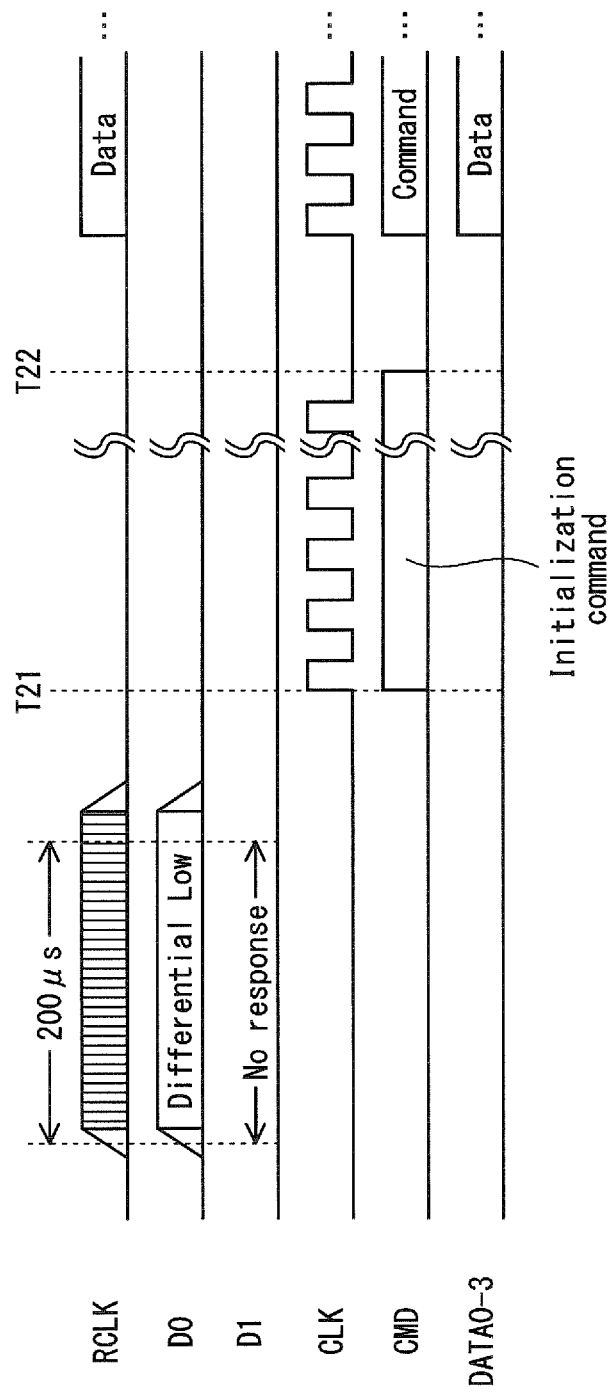
FIG. 10 is a timing chart of the host initialization protocol processing, when the host initialization protocol processing is performed using a single-ended signal.

FIG. 9 is a flowchart of the host initialization protocol processing. FIG. 10 is a timing chart of the host initialization protocol processing using a single-ended signal.

The host initialization protocol processing starts when the link controller 172 and the physical layer PHY 171 are initialized.

When the link controller 172 and the physical layer PHY 171 are initialized and the host differential interface circuit 170 is activated appropriately (Until S900 is Yes, Step S900: No is repeated), the link controller 172 outputs a logical value "0" to the data converting circuit 173. Then the link controller 172 activates the differential clock output circuit 177 by outputting an enable signal thereto, and activates the differential data output circuit 178 by outputting an enable mode signal thereto.

When the differential clock output circuit 177 is activated, the differential clock output circuit 177 generates a differential reference signal of 150 MHz by using a clock signal of 150 MHz input from a clock generator. Then the generated signal is output through the DAT0/RCLK+ terminal 157 and the DAT1/RCLK− terminal 158. When the differential data output circuit 178 is activated, a differential Low signal corresponding to the input logical value "0" is output to the D0+ terminal 159 and the D0− terminal 160 (Step S910).

On the other hand, the link controller 172 checks whether the differential Low signal is input through the D1+ terminal 161 and the D1− terminal 162 within a predetermined time period t1 (for example, 200 μs) elapsed since the enable signal was output to the differential data output circuit 178 (Step S920).

In a processing of Step S920, when the differential Low signal is input within the predetermined time period t1 (for example, 200 μs) (Step S920: Yes), the link controller 172 causes the differential data output circuit 178 to repeatedly output a differential synchronization signal through the D0+ terminal 159 and the D0− terminal 160 (Step S930), and then waits for the differential synchronization signal to be input through the D1+ terminal 161 and the D1− terminal 162 (Step S940).

When the differential data input circuit 179 receives the differential synchronization signal input through the D1+ terminal 161 and the D1− terminal 162, the link controller 172 causes the differential data output circuit 178 to output the differential Low signal through the D0+ terminal 159 and the D0− terminal 160 for a predetermined cycle. After that, the differential data output circuit 178 is placed in an inactive state, and accordingly a differential signal stops being output (Step S950).

When the link controller 172 stops outputting the differential signal by placing the differential data output circuit 178 in the inactive state, the host initialization protocol processing ends.

In this case, even when the host initialization protocol processing ends, the differential clock output circuit 177 continues outputting the differential reference signal.

In a processing of Step S920, when the differential Low signal is not input within the predetermined time period t1 (for example, 200 μs) (Step S920: No), the link controller 172 places the differential clock output circuit 177 in an inactive state so as to stop outputting the differential reference signal, and places the differential data output circuit 178 in an inactive state so as to stop outputting the differential Low signal (Step S960).

Examples in which the differential Low signal is not input within the predetermined time period t1 (for example, 200 μs) in a processing of Step S920 are as follows: a circuit of device 100 for transmitting/receiving a differential signal is broken; the device 100 and the host 150 cannot communicate with each other appropriately using a differential signal, due to a problem such as contact failure between a terminal of the device 100 and a terminal of the host 150; and a device inserted in the connector 200 is not the device 100 and not equipped with a circuit for transmitting/receiving a differential signal.

When a processing of Step S960 ends, the link controller 172 outputs, to the data processing circuit 192 through the bus 166, a signal indicating that communication using a differential signal has not been performed appropriately.

When receiving the signal indicating that communication using a differential signal has not been performed appropriately, the data processing circuit 192 communicates with the data processing circuit 142 using a single-ended signal so as to initialize the device 100 (Step S970: between times T21-T22 in FIG. 10).

When the device 100 is initialized, the host initialization protocol processing ends.

In this case, communication between the device 100 and the host 150 after that is performed using a single-ended signal.

<Packet Transmission Processing>

The packet transmission processing represents a processing in which the host 150 transmits a packet to the device 100, or the device 100 transmits a packet to the host 150, using a differential signal.

The following explains a case where the host 150 transmits a packet to the device 100 using a differential signal. However, a case where the device 100 transmits a packet signal to the host 150 using a differential signal is the same processing.

Figure 11:
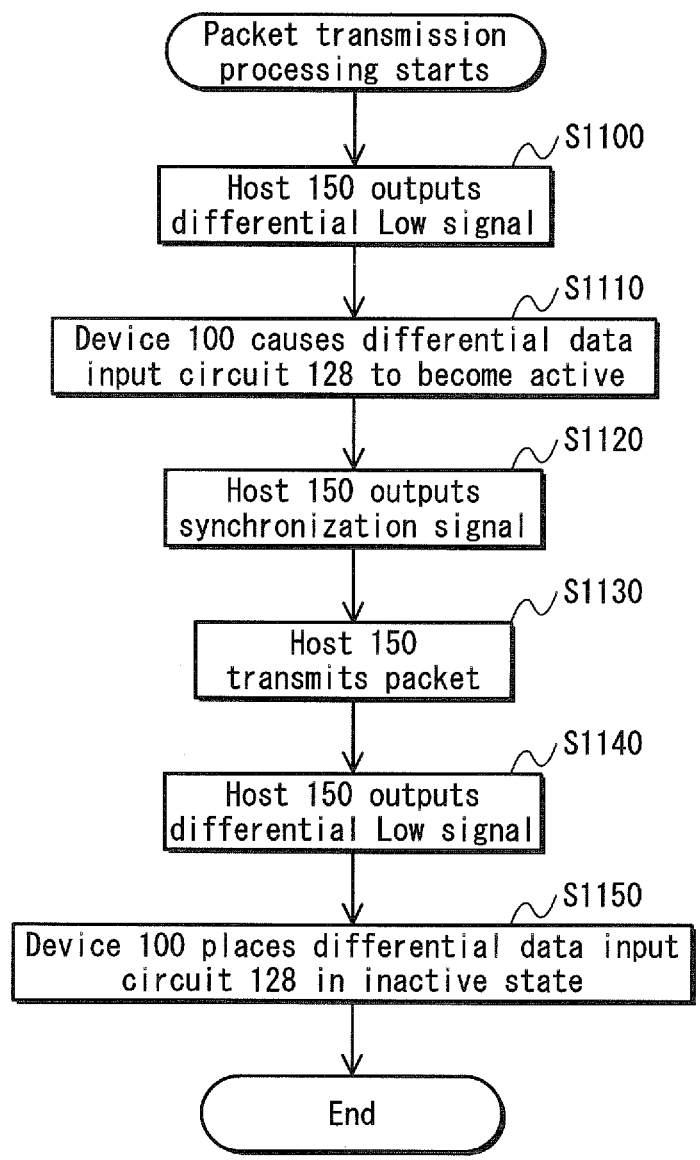
FIG. 11 is a flowchart of a packet transmission processing.
Figure 12:
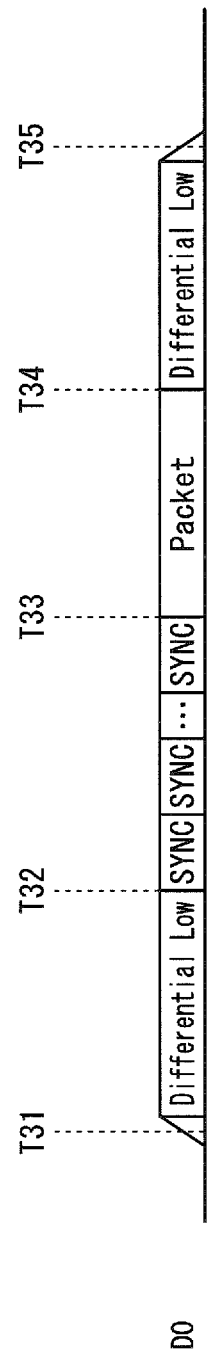
FIG. 12 is a timing chart of the packet transmission processing.

FIG. 11 is a flowchart of a packet transmission processing. FIG. 12 is a timing chart of a packet transmission processing.

In a processing of transmitting a packet to the device 100 using a differential signal, the link controller 172 of the host 150 first causes the differential data output circuit 178 to output a differential Low signal through the D0+ terminal 159 and the D0− terminal 160 for a predetermined cycle (Step S1100: time T31 in FIG. 12).

When the differential Low signal is input through the D0+ terminal 109 and the D0− terminal 110 of the device 100, the detection circuit 126 detects input of the differential Low signal and accordingly outputs a receive-enable signal. The differential data input circuit 128 then becomes active (Step S1110) to start receiving the differential Low signal.

When outputting the differential Low signal for a predetermined cycle, the link controller 172 of the host 150 causes the differential data output circuit 178 to output a differential synchronization signal that continues, for example, 10 times, through the D0+ terminal 159 and the D0− terminal 160 (Step S1120: time T32).

The link controller 122 of the device 100 receives the differential synchronization signal through the differential data input circuit 128.

After a processing of Step S1120 ends, the link controller 172 of the host 150 causes the differential data output circuit 178 to output a packet composed of a differential signal through the D0+ terminal 159 and the D0− terminal 160 (Step S1130: time T33).

The link controller 122 of the device 100 receives a packet through the differential data input circuit 128.

After a processing of Step S1130 ends, the link controller 172 of the host 150 causes the differential data output circuit 178 to output a differential Low signal through the D0+ terminal 159 and the D0− terminal 160 (Step S1140: time T34).

When receiving the differential Low signal through the differential data input circuit 128, the link controller 122 of the device 100 places the differential data output circuit 178 in an inactive state. Accordingly, the differential signal stops being output through the D0+ terminal 159 and the D0− terminal 160 (Step S1150: time T35).

When the differential signal stops being input through the D0+ terminal 109 and the D0− terminal 110, the detection circuit 126 no longer detects the differential signal, and stops outputting the receive-enable signal. Accordingly, the differential data input circuit 128 is placed in an inactive state, and the packet transmission processing ends.

<Host Standby Mode Transition Processing>

In the host standby mode transition processing, the host 150 communicates with the device 100 so that the device 100 is transited to a standby mode.

Figure 13:
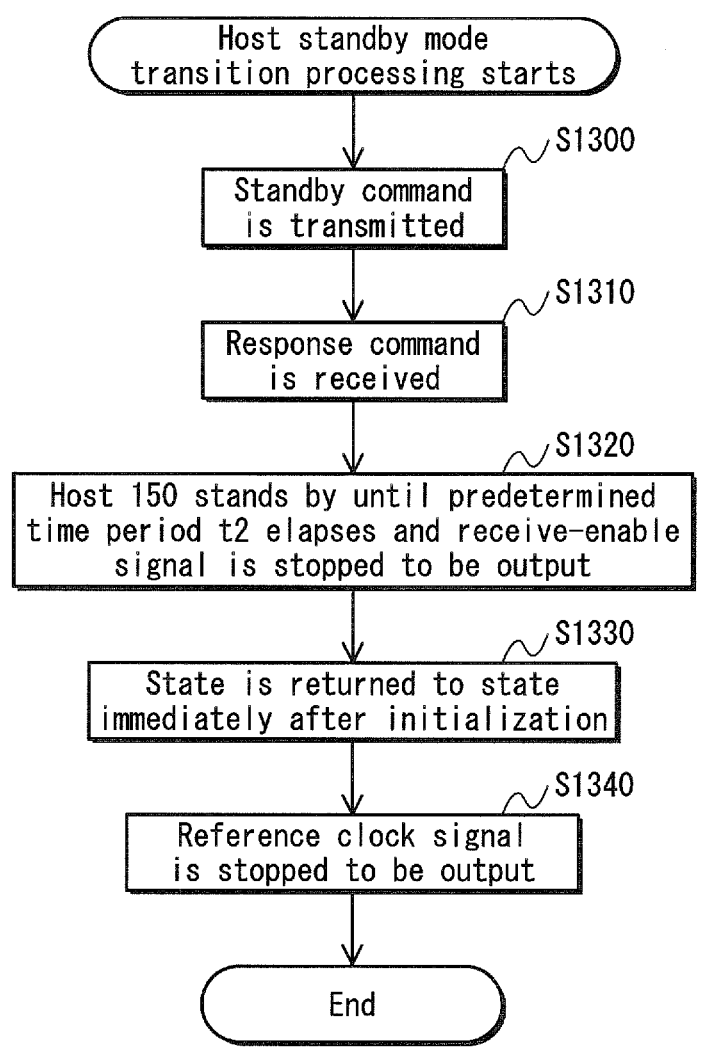
FIG. 13 is a flowchart of a host standby mode transition processing.

FIG. 13 is a flowchart of the host standby mode transition processing.

When the host standby mode transition processing starts, the host 150 transmits a command (hereinafter, referred to as a standby command) placing the device 100 in a standby mode to the device 100, as a packet (Step S1300). Transmission of a standby command is realized by the above described packet transmission processing.

When receiving a command (hereinafter, referred to as a response command) from the device 100 indicating that the standby command has been received (step S1310), the host 150 stands by until a predetermined time period t2 (for example, 200 μs) elapses since the standby command was transmitted and the detection circuit 176 stops outputting the receive-enable signal (Step S1320).

After a processing of Step S1320 ends, the host 150 causes the link controller 172 and the physical layer PHY 171 to return to a state immediately after power-on reset initialization (Step S1330), and stops outputting a differential reference signal from the differential clock output circuit 177 (Step S1340).

When the host 150 causes the differential clock output circuit 177 to stop outputting the differential reference signal, the host standby mode transition processing ends.

<Device Standby Mode Transition Processing>

The device standby mode transition processing represents a processing in which the device 100 receives a standby command from the host 150 and places the device 100 per se in a standby mode.

Figure 14:
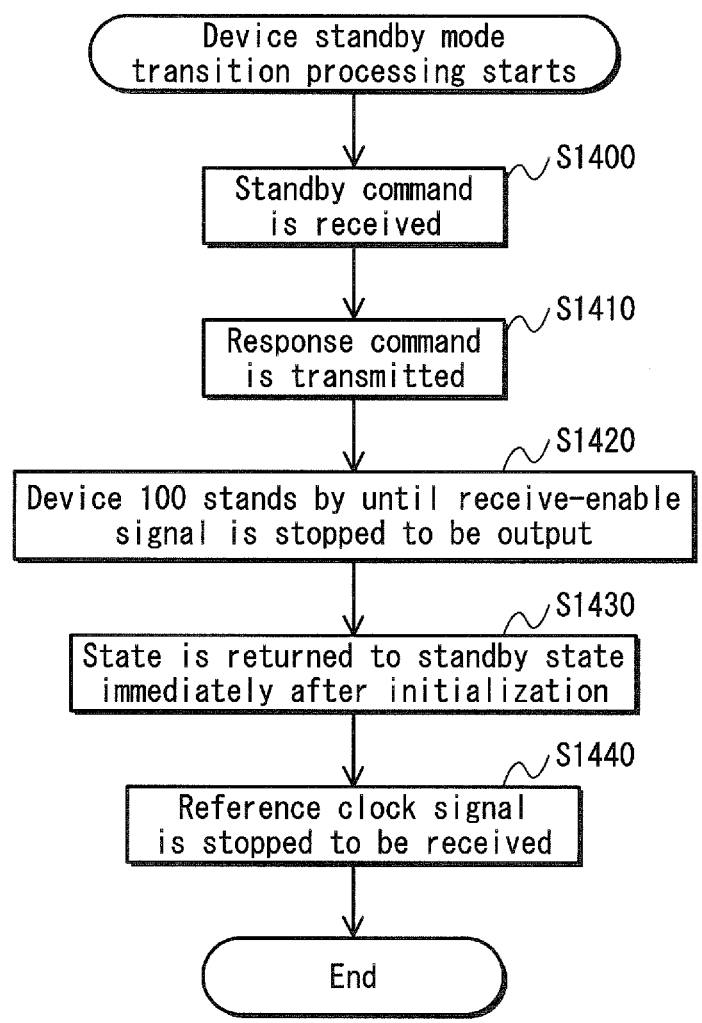
FIG. 14 is a flowchart of a device standby mode transition processing.

FIG. 14 is a flowchart of the device standby mode transition processing.

The device standby mode transition processing starts when the device 100 receives a standby command transmitted by the host 150.

When receiving a standby command transmitted by the host 150 (Step S1400), the device 100 transmits, to the host 150, a command (hereinafter, referred to as a response command) indicating that the standby command has been received (Step S1410). Transmission of the response command is realized by the above described packet transmission processing.

When a processing of Step S1410 ends, the device 100 stands by until the detection circuit 126 stops outputting a receive-enable signal (Step S1420).

When a processing of Step S1420 ends, the device 100 places each of the link controller 122 and the physical layer PHY 121 in a standby mode, which is the same as a state immediately after power-on reset initialization (Step S1430).

In a processing of Step S1430, the link controller 122 stops outputting the enable mode signal and the activate signal.

When a processing of Step S1430 ends, the device 100 stops receiving the differential reference signal input from the host 150 (Step S1440). Accordingly, the device standby mode transition processing ends.

Here, the device 100 needs to execute processings from transmission of the response command to the host 150 (Step S1410) to stop of reception of the differential reference signal input from the host 150 (Step S1440), within a predetermined time period t2 (for example, 200 μs).

This is because, when stopping receiving the differential reference signal, the device 100 becomes unable to execute processings of Step S1430 and Step S1440.

In other words, the host 150 needs to stand by for the predetermined time period t2 (for example, 200 μs) in Step S1320 (see FIG. 13), so that the device 100 can normally execute Step S1430 and Step S1440.

<Conclusion>

According to the system composed of the device 100 and the host 150, the host 150 controls input of a differential signal through the pair of dedicated receiving terminals (D0+ terminal 109 and D0− terminal 110) for a differential signal, so as to control activation of the differential data input circuit 128 connected to the pair of terminals (the DAT0/RCLK+ terminal 107 and the DAT1/RCLK− terminal 108) used for receiving a differential signal and transmitting/receiving a single-ended signal. After the activation, the differential data input circuit 128 is maintained active by the enable mode signal output by the link controller 122.

When receiving the standby command while outputting the enable mode signal, the link controller 122 waits until the detection circuit 126 no longer detects input of a differential signal, and then stops outputting the enable mode signal.

Besides, once the initialization protocol processing makes oscillation of the PLL circuit 124 stable, the PLL circuit 124 continues oscillating until the standby mode transition processing stops an operation of the PLL circuit 124. Accordingly, the device 100 does not need to wait for the PLL circuit 124 to start oscillating at each communication.

<Modification>
<Overview>

The following explains an interface circuit used in a modified system that is formed by modifying a part of a system composed of the device 100 and the host 150 pertaining to the embodiment, as a modification of the interface circuit pertaining to the present invention.

In the embodiment, each differential signal output circuit for outputting a differential signal constantly outputs a signal of a VSS potential through the data output terminal out0 and the data output terminal out1 while an enable signal is not being input through the enable signal input terminal en. However, the modification explains an example of each differential signal output circuit for outputting a differential signal, in which the data output terminal out0 and the data output terminal out1 are placed in a high impedance state while an enable signal is not being input through the enable signal input terminal en.

The following explains a structure of an interface circuit pertaining to the present modification with reference to the drawings, and the explanation centers around a difference from the interface circuit pertaining to the embodiment.

<Structure>

Figure 15:
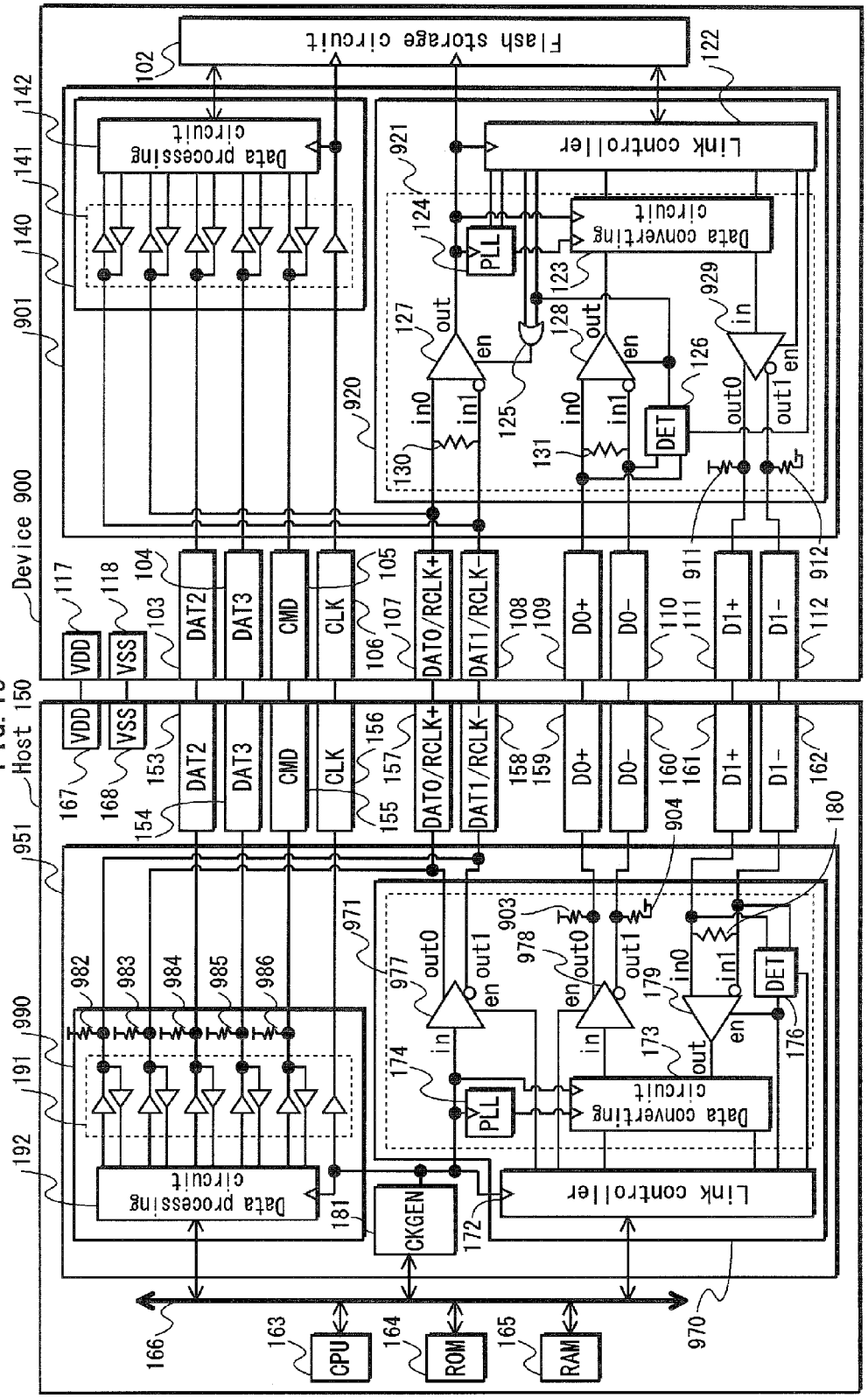
FIG. 15 is a circuit diagram including a device 900 and a host 950.

FIG. 15 is a circuit diagram including a device 900 and a host 950.

A device 900 is formed by modifying the device 100 in the embodiment so that the differential data output circuit 129 is modified to a differential data output circuit 929, a pull-up resistance 911 is additionally connected to a wire connected to the D1+ terminal 111, and a pull-up resistance 912 is additionally connected to a wire connected to the D1− terminal 112.

In accordance with these modifications and additions, the physical layer PHY 121 that is at a higher hierarchy than the modified or added circuits is modified to a physical layer PHY 921, the device differential interface circuit 120 is modified to a device differential interface circuit 920, and the device interface circuit 101 is modified to a device interface circuit 901.

The differential data output circuit 929 is formed by modifying a part of the functions of the differential data output circuit 129 in the embodiment, and includes the following function in addition to Function 1 of the differential data output circuit 129.

Modified Function 2: to be in an inactive state while an enable signal is not being input through the enable signal input terminal en, and place each output of the data output terminal out0 and the data output terminal out1 in a high impedance state.

Each of the pull-up resistances 911 and 912 pulls a potential up to a VDD potential (for example, 3.3 V), so that a corresponding wire is not placed in a high impedance state. Each resistance value of the pull-up resistances 911 and 912 is, for example, 50 kΩ.

The host 950 is formed by modifying the host 150 in the embodiment so that the differential clock output circuit 177 is modified to a differential clock output circuit 977, the differential data output circuit 178 is modified to a differential data output circuit 978, a pull-up resistance 903 is additionally connected to a wire connected to the D0+ terminal 159, and a pull-up resistance 904 is additionally connected to a wire connected to the D0− terminal 160.

In accordance with these modifications and additions, the physical layer PHY 171 that is at a higher hierarchy than the modified or added circuits is modified to a physical layer PHY 971, the host differential interface circuit 170 is modified to a host differential interface circuit 970, the host single-ended interface circuit 190 is modified to a host single-ended interface circuit 990, and the host interface circuit 151 is modified to a device interface circuit 951.

The differential clock output circuit 977 includes the same circuit structure and characteristics as the differential data output circuit 929.

The differential data output circuit 978 includes the same circuit structure and characteristics as the differential data output circuit 929.

<Differential Signal>

The following explains a differential signal used for communication between the device 900 and the host 950, with reference to the drawing.

Figure 16:
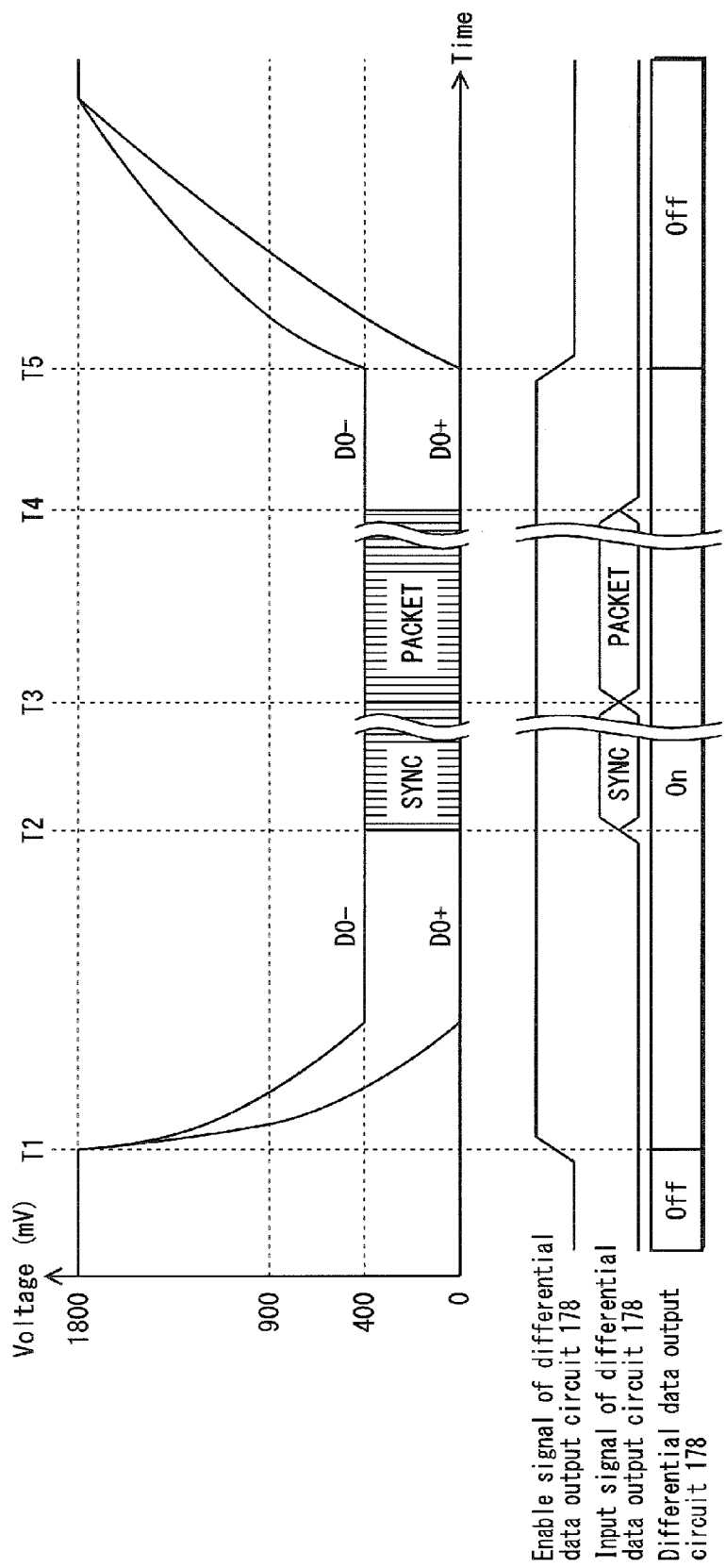
FIG. 16 is a timing chart of a differential signal in a modification.

FIG. 16 is a timing chart of a differential signal output from the differential data output circuit 978, as an example of a differential signal used in communication between the device 900 and the host 950.

As FIG. 16 shows, a differential signal used in communication between the device 100 and the host 150 is 400 mV in amplitude, and when a potential of one signal wire is 0 V, a potential of another signal wire is 400 mV.

Besides, while output of the differential data output circuit 978 is in a high impedance state, each of the D0+ terminal 159 and the D0− terminal 160 is pulled up to a VDD potential (for example, 3.3 V) by a corresponding pull-up resistance.

Prior to a time T1, a logical value of an enable signal of the differential data output circuit 978 is "0", and accordingly, the differential data output circuit 178 is in an inactive state. Both of the D0+ terminal 159 and the D0− terminal 160 are pulled up by the pull-up resistances to a VDD potential (for example, 3.3 V).

When the logical value of the enable signal of differential data output circuit 978 changes from "0" to "1" at the time T1, a state of the differential data output circuit 978 changes from an inactive state to an active state. Since a logical value of an input signal is "0", the differential data output circuit 978 starts outputting a differential Low signal, where a voltage of the D0+ terminal 159 is 0 V and a voltage of the D0− terminal 160 is 400 mV, for example.

The differential data output circuit 178 operates at an operating frequency of 1500 Hz in the active state, and continues outputting the differential Low signal while the logical value "0" is being input.

When a synchronization signal of a predetermined number of cycles starts being input in the differential data output circuit 178 at a time T2, the differential data output circuit 178 starts outputting a differential synchronization signal.

When a packet signal starts being input in the differential data output circuit 178 at a time T3, the differential data output circuit 178 starts outputting a differential packet signal.

When a logical value of an input signal of the differential data output circuit 178 becomes "0" at a time T4, the differential data output circuit 178 starts outputting the differential Low signal, where a voltage of the D0+ terminal of the D0+ terminal 159 is 0 V and a voltage of the D0− terminal 160 is 400 mV.

When a logical value of an enable signal of the differential data output circuit 178 changes from "1" to "0" at a time T5, a state of the differential data output circuit 178 changes from an active state to an inactive state. Then both of the D0+ terminal 159 and the D0− terminal 160 are pulled up to a VDD potential (for example, 1.8 V) by the pull-up resistances.

<Operation>

A modified system composed of the device 900 and the host 950 performs the same processings as the system composed of the device 100 and the host 150 in the embodiment.

Therefore, here, an explanation of an operation of the modified system composed of the device 900 and the host 950 is omitted.

<Supplementary>

As above, the interface circuit that supports both the single-ended method and the differential method as a transmission method has been explained as the embodiment of the interface circuit pertaining to the present invention, using the embodiment and the modification. However, it is possible to modify the interface circuit as below, and the present invention is of course not limited to the interface circuit described by the above described embodiment (1) In the embodiment, the device 100 was explained as a memory card. However, if the device 100 includes a circuit having the same function as the device interface circuit 101, the device 100 is not necessarily a memory card.

For example, a WLAN (Wireless Local Area Network) device including a component such as an RF (Radio Frequency) transceiver can be expected.

(2) In the embodiment, the host 150 was explained as a personal computer. However, if the host 150 includes a circuit having the same function as the host interface circuit 151, the host 150 is not necessarily a personal computer.

For example, an AV (Audio Visual) apparatus such as a blu-ray recorder and a device such as a mobile phone can be expected.

(3) The embodiment explained that the PLL circuit 124 and the PLL circuit 174 output an output clock signal 10 times the input clock signal. However, if each of the PLL circuit 124 and the PLL circuit 174 includes a function for converting a clock frequency generated by the clock generator 181 to an operating frequency of a differential signal used for communication, it is not necessarily to output the output clock signal 10 times the input clock signal, and for example, 30 times may be possible.

(4) The embodiment explained that the clock generator 181 output a clock signal whose frequency was 150 MHz to the PLL circuit 174. However, if a frequency of the clock signal multiplied by the PLL circuit 174 can be an operating frequency of a differential signal used for communication, it is not necessarily to output the clock signal of 150 MHz, and accordingly a clock signal of 50 MHz may be output.

(5) In the embodiment, an amplitude of a differential signal used for communication was explained as 400 mV. However, if the device 100 and the host 150 are available for communication, an amplitude is not necessarily 400 mV, and for example, 200 mV or 800 mV may be possible.

(6) The embodiment explained that the data converting circuit 123 performed encoding/decoding in 8 b/10 b encoding. However, if it is possible to encode/decode to enhance quality of a differential signal used for communication, it is not necessarily to encode/decode in 8 b/10 b encoding. For example, encoding/decoding in 64 b/66 b encoding may be possible.

Furthermore, encoding per se may be unnecessary.

(7) The embodiment explained that the device 100 was supplied with electric power whose potential difference was 3.3 V. However, if the device 100 can operate normally, a potential difference is not necessarily 3.3 V, and for example, 1.8 V may be possible. Alternatively, electric power source terminals for a single-ended interface and a differential interface may be provided independently, and electric power whose potential difference is 3.3 V may be supplied to the single-ended interface, and electric power whose potential difference is 1.8 V may be supplied to the differential interface.

(8) The embodiment explained that the host processing started when a user input a notification signal indicating the device 100 was electrically connected to the CPU 163. However, if the device 100 starts the processing by detecting that the device 100 is electrically connected to the host 150, it is not necessarily that the processing starts when a user inputs a command indicating that the device 100 is electrically connected to the host 150.

For example, the connector 200 may include a sensor detecting that the device 100 is inserted, and the host processing may start when the sensor detects that the device 100 is inserted in the connector 200.

(9) In the modification, the detection circuit 126 output the receive-enable signal when a potential difference in the pair of input terminals was higher than the threshold value (here, 200 mV). However, if the detection circuit 126 can detect that a differential signal is input to the pair of input terminals and output a receive-enable signal, the detection circuit 126 does not necessarily output the receive-enable signal when a potential difference in the pair of input terminals is higher than the threshold value.

Figure 17:
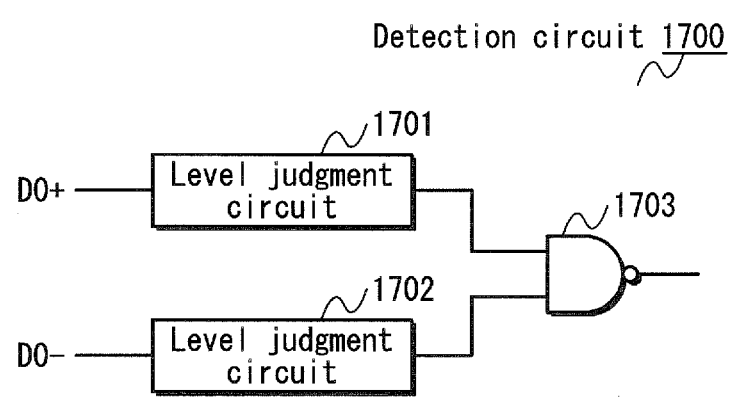
FIG. 17 is a block diagram showing a circuit structure of a detection circuit 1700.

For example, a detection circuit 1700 shown in FIG. 17 can be expected.

The detection circuit 1700 includes a level judgment circuit 1701, a level judgment circuit 1702 and a two-input NAND circuit 1703, and includes two input terminals and an output terminal.

Each of the level judgment circuits 1701 and 1702 outputs, (i) when a signal equal to or higher than a predetermined potential (for example, 1.35 V) between a pull-up potential (for example, 3.3 V) and the maximum potential (for example, 400 mV) of a differential signal is input, a logical value "1", and (ii) when a signal lower than the predetermined potential is input, a logical value "0".

The detection circuit 1700, (i) when each of the two input terminals has a pull-up potential (for example, 1.8V), outputs a logical value "0", and (ii) when at least one of the two input terminals has a potential lower than the maximum potential (for example, 400 mV) of a differential signal, outputs a logical value "1".

Accordingly, the detection circuit 1700 can be used as a circuit for detecting that a differential signal is input to the pair of input terminals and outputting a receive-enable signal, instead of the detection circuit 126 in the modification.

(10) In the embodiment, when the differential data output circuit 129 was in an inactive state, the built-in pull-down circuit made a potential of the data output terminal out0 and the data output terminal out1 a VSS potential. However, if a potential of the D1+ terminal 111 and the D1− terminal 112 are a VSS potential when the differential data output circuit 129 is in the inactive state, it is not necessarily that the built-in pull-down circuit makes a potential of the data output terminal out0 and the data output terminal out1 a VSS potential.

For example, when the differential data output circuit 129 is in an inactive state, the data output terminal out0 and the data output terminal out1 may be placed in a high impedance state, and a pull-down resistance outside the differential data output circuit 129 may be connected to each of the D1+ terminal 111 and the D1− terminal 112.

(11) The following further explains a structure of an interface circuit pertaining to the embodiment of the present invention, and its modification and its effect.

(a) An interface circuit pertaining to the embodiment of the present invention comprises a first input terminal to which a single-ended signal and a differential signal are transmitted through an external first transmission path; a second input terminal to which a differential signal is transmitted through an external second transmission path; a single-ended signal receiver and a differential signal receiver which are connected to the first input terminal by wires, and to which the single-ended signal and the differential signal input from the first input terminal are supplied in parallel; a detection circuit that is connected to the second input terminal by wires and is operable to detect input of the differential signal thereto from the second input terminal; and a controller operable, when the detection circuit detects the input of the differential signal thereto from the second input terminal, to start constantly outputting an enable signal to the differential signal receiver, wherein when the detection circuit detects the input of the differential signal thereto from the second input terminal while the differential signal receiver is in an inactive state, the detection circuit activates the differential signal receiver, and the differential signal receiver remains in an active state while the enable signal is being input thereto.

According to the interface circuit of the present invention with the above structure, the differential signal receiver remains in the active state while the enable signal is being input thereto.

Accordingly, the possibility of the differential signal receiver stopping at an unexpected timing is reduced.

Figure 18:
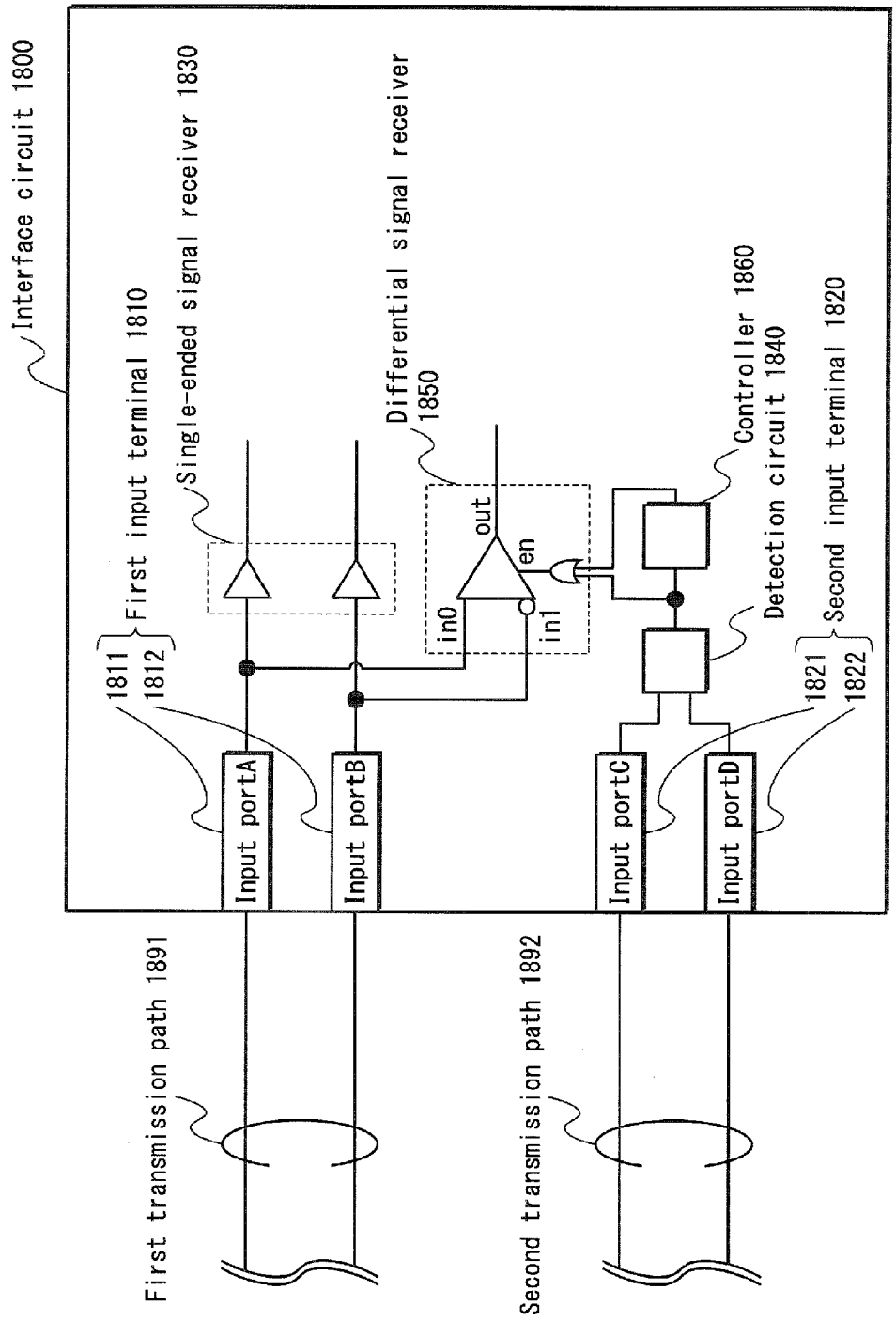
FIG. 18 is a circuit diagram of an interface circuit 1800.

FIG. 18 is a circuit diagram of an interface circuit 1800 in the above mentioned modification.

As FIG. 18 shows, the interface circuit 1800 includes a first input terminal 1810 composed of input ports A1811 and B1812, a second input terminal 1820 composed of input ports C1821 and D1822, a single-ended signal receiver 1830, a differential signal receiver 1850, a detection circuit 1840 and a controller 1860.

To the first input terminal 1810, a single-ended signal and a differential signal are input through a first transmission path 1891.

To the second input terminal 1820, a differential signal is input through a second transmission path 1892.

The single-ended signal receiver 1830 and the differential signal receiver 1850 are connected to the first input terminal 1810 by wires, and the signals input through the first input terminal 1810 are supplied in parallel.

The detection circuit 1840 is electrically connected to the second input terminal 1820 by wires, and detects input of the differential signal from the second input terminal 1820. When the detection circuit 1840 detects the input of the differential signal while the differential signal receiver 1850 is in an inactive state, the differential signal receiver 1850 is activated.

When the detection circuit 1840 detects the differential signal, the controller 1860 outputs an enable signal to the differential signal receiver 1850.

The differential signal receiver 1850 remains in an active state while the enable signal is being input thereto from the controller 1860.

The single-ended signal receiver 1830 is, for example, realized by a pair of CMOS buffers.

The detection circuit 1840 is, for example, realized as the detection circuit 126 (see FIG. 1) in the embodiment.

The differential signal receiver 1850 includes, for example, the OR circuit 125 and differential clock input circuit 127 in the embodiment, and is realized by connecting output of the OR circuit 125 to the enable signal input terminal en of the differential clock input circuit 127.

(b) Also, when a differential clock signal is input to the differential signal receiver while the differential signal receiver is in the active state, the differential signal receiver generates and outputs a first clock signal that is a single-ended signal whose frequency is the same as a frequency of the differential clock signal, the interface circuit further comprises: a clock converting circuit operable, when the first clock signal output from the differential signal receiver is input thereto, to generate and output a second clock signal whose frequency is higher than the frequency of the first clock signal; a differential data signal receiver that is connected to the second input terminal by wires and is operable to receive the differential signal input thereto from the second input terminal; and a differential signal driver operable, when in an active state, to output a differential signal that is synchronous with the second clock signal to an external third transmission path, when the detection circuit detects the input of the differential signal thereto from the second input terminal while the differential data signal receiver is in an inactive state, the detection circuit activates the differential data signal receiver, and when the detection circuit no longer detects the input of the differential signal thereto from the second input terminal while the differential data signal receiver is in an active state, the detection circuit inactivates the differential data signal receiver, and when the differential signal driver is in an inactive state, output from the differential signal driver is in a high impedance state.

Thereby, it is possible to place the differential data signal receiver to an inactive state while the differential signal receiver remains active, by controlling the differential signal input through the second input terminal.

(c) The interface circuit of Claim 2, further comprising a state maintaining circuit operable to maintain a potential of the third transmission path at a ground potential when the differential signal driver is in the inactive state, wherein the detection circuit performs detection of the input of the differential signal thereto from the second input terminal when a potential of an amplitude of the differential signal input thereto from the second input terminal is equal to or higher than a predetermined potential.

Thereby, it is possible to know that the differential signal driver is in an active state by checking that a potential of the third transmission path is not maintained at a ground potential.

(d) Also, the interface circuit of Claim 2, further comprising a state maintaining circuit operable, when the differential signal driver is in the inactive state, to maintain a potential of the third transmission path at a first predetermined potential that is higher than a ground potential, wherein the detection circuit performs detection of the input of the differential signal input thereto from the second input terminal when a potential of the differential signal input thereto from the second input terminal is equal to or lower than a second predetermined potential that is higher than the ground potential and lower than the first predetermined potential.

Thereby, it is possible to know that the differential signal driver is in an active state by checking that a potential of the third transmission path is not maintained at the first predetermined potential.

(e) Also, the interface circuit of Claim 3, which communicates with an external host interface circuit, wherein the host interface circuit comprises: a host differential clock signal driver operable to output the differential clock signal to the first transmission path; a host differential data signal driver operable to output the differential signal that is to be transmitted to the second input terminal through the second transmission path; a host differential data signal receiver operable to receive the differential signal transmitted through the third transmission path; and a host controller operable to cause the host differential data signal driver to output a waiting signal composed of a first predetermined differential signal, wherein while the host differential clock signal driver is outputting the differential clock signal and the host differential data signal driver is being caused to output the waiting signal, when the host differential data signal receiver receives a response signal composed of a second predetermined differential signal in response to the waiting signal, the host controller causes the host differential clock signal driver to stop outputting the differential clock signal when a predetermined time period has elapsed since the host differential data signal receiver received the response signal.

Thereby, in the case where a waiting signal is input through the second transmission path, a differential clock signal input through the first transmission path becomes inactive, as long as the differential signal driver outputs a response signal.

(f) Also, when the detection circuit no longer detects the input of the differential signal thereto from the second input terminal while the enable signal is being output to the differential signal receiver and the waiting signal is being input to the differential data signal receiver in the active state, the controller causes the differential signal driver to output the response signal and stops the output of the enable signal within the predetermined time period after the differential signal driver was caused to output the response signal.

Thereby, in the case where a waiting signal is input through the second transmission path, the differential signal driver outputs a response signal and the controller stops outputting an enable signal, as long as the detection circuit no longer detects the input of the differential signal.

INDUSTRIAL APPLICABILITY

The present invention can be widely used in devices that include an interface circuit for performing transmission using a differential signal.

REFERENCE SINGS LIST 100 device
101 device interface circuit
120 device differential interface circuit
121 physical layer PHY
122 link controller
123 data converting circuit
124 PLL circuit
125 OR circuit
126 detection circuit
127 differential clock input circuit
128 differential data input circuit
129 differential data output circuit
140 device single-ended interface circuit
141 buffer circuit
142 data processing circuit
150 host
151 host interface circuit
170 host differential interface circuit
171 physical layer PHY
172 link controller
173 data converting circuit
174 PLL circuit
176 detection circuit
177 differential clock output circuit
178 differential data output circuit
179 differential data input circuit
181 clock generator
190 device single-ended interface circuit
191 buffer circuit
192 data processing circuit

The invention claimed is:

1. An interface circuit comprising:
a first input terminal to which a single-ended signal and a differential signal are transmitted through an external first transmission path;
a second input terminal to which a differential signal is transmitted through an external second transmission path;
a single-ended signal receiver and a differential signal receiver which are connected to the first input terminal by wires, and to which the single-ended signal and the differential signal input from the first input terminal are supplied in parallel;
a detection circuit that is connected to the second input terminal by wires and is operable to detect input of the differential signal thereto from the second input terminal; and
a controller operable, when the detection circuit detects the input of the differential signal thereto from the second input terminal, to start constantly outputting an enable signal to the differential signal receiver, wherein
when the detection circuit detects the input of the differential signal thereto from the second input terminal while the differential signal receiver is in an inactive state, the detection circuit activates the differential signal receiver, and
the differential signal receiver remains in an active state while the enable signal is being input thereto.

2. The interface circuit of claim 1, wherein
when a differential clock signal is input to the differential signal receiver while the differential signal receiver is in the active state, the differential signal receiver generates and outputs a first clock signal that is a single-ended signal whose frequency is the same as a frequency of the differential clock signal,
the interface circuit further comprises:
a clock converting circuit operable, when the first clock signal output from the differential signal receiver is input thereto, to generate and output a second clock signal whose frequency is higher than the frequency of the first clock signal;
a differential data signal receiver that is connected to the second input terminal by wires and is operable to receive the differential signal input thereto from the second input terminal; and a differential signal driver operable, when in an active state, to output a differential signal that is synchronous with the second clock signal to an external third transmission path, when the detection circuit detects the input of the differential signal thereto from the second input terminal while the differential data signal receiver is in an inactive state, the detection circuit activates the differential data signal receiver, and when the detection circuit no longer detects the input of the differential signal thereto from the second input terminal while the differential data signal receiver is in an active state, the detection circuit inactivates the differential data signal receiver, and when the differential signal driver is in an inactive state, output from the differential signal driver is in a high impedance state.

3. The interface circuit of claim 2, further comprising a state maintaining circuit operable to maintain a potential of the third transmission path at a ground potential when the differential signal driver is in the inactive state, wherein the detection circuit performs detection of the input of the differential signal thereto from the second input terminal when a potential of an amplitude of the differential signal input thereto from the second input terminal is equal to or higher than a predetermined potential.

4. The interface circuit of claim 2, further comprising a state maintaining circuit operable, when the differential signal driver is in the inactive state, to maintain a potential of the third transmission path at a first predetermined potential that is higher than a ground potential, wherein the detection circuit performs detection of the input of the differential signal input thereto from the second input terminal when a potential of the differential signal input thereto from the second input terminal is equal to or lower than a second predetermined potential that is higher than the ground potential and lower than the first predetermined potential.

5. The interface circuit of claim 3, which communicates with an external host interface circuit, wherein the host interface circuit comprises:

a host differential clock signal driver operable to output the differential clock signal to the first transmission path;

a host differential data signal driver operable to output the differential signal that is to be transmitted to the second input terminal through the second transmission path;

a host differential data signal receiver operable to receive the differential signal transmitted through the third transmission path; and a host controller operable to cause the host differential data signal driver to output a waiting signal composed of a first predetermined differential signal, wherein while the host differential clock signal driver is outputting the differential clock signal and the host differential data signal driver is being caused to output the waiting signal, when the host differential data signal receiver receives a response signal composed of a second predetermined differential signal in response to the waiting signal, the host controller causes the host differential clock signal driver to stop outputting the differential clock signal when a predetermined time period has elapsed since the host differential data signal receiver received the response signal.

6. The interface circuit of claim 5, wherein when the detection circuit no longer detects the input of the differential signal thereto from the second input terminal while the enable signal is being output to the differential signal receiver and the waiting signal is being input to the differential data signal receiver in the active state, the controller causes the differential signal driver to output the response signal and stops the output of the enable signal within the predetermined time period after the differential signal driver was caused to output the response signal.

7. An interface system comprising:

a first transmission path to which a single-ended signal and a differential signal are transmitted;

a second transmission path to which a differential signal is transmitted;

a differential signal driver operable to output a differential signal to the first transmission path;

a single-ended signal driver operable to output a single-ended signal to the first transmission path;

a differential data signal driver operable to output a differential signal to the second transmission path;

a single-ended signal receiver and a differential signal receiver to which the single-ended signal and the differential signal transmitted to the first transmission path are supplied in parallel;

a detection circuit operable to detect transmission of the differential signal through the second transmission path; and a controller operable, when the detection circuit detects the transmission of the differential signal through the second transmission path, to start constantly outputting an enable signal to the differential signal receiver, wherein when the detection circuit detects the transmission of the differential signal through the second transmission path while the differential signal receiver is in an inactive state, the detection circuit activates the differential signal receiver, and the differential signal receiver remains in an active state while the enable signal is being input thereto.

* * * * *